US012799287B2

(12) United States Patent
Yahiro et al.

(10) Patent No.: US 12,799,287 B2
(45) Date of Patent: Nov. 17, 2026

(54) LAMINATED POLYESTER FILM, AND METHOD FOR PRODUCING POLYESTER FILM

(71) Applicant: TORAY INDUSTRIES, INC., Tokyo (JP)

(72) Inventors: Kensuke Yahiro, Otsu (JP); Tadamasa Suzuki, Otsu (JP); Sho Tsubokura, Otsu (JP); Takuji Higashioji, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 546 days.

(21) Appl. No.: 18/275,533

(22) PCT Filed: Jan. 24, 2022

(86) PCT No.: PCT/JP2022/002364

§ 371 (c)(1),
(2) Date: Aug. 2, 2023

(87) PCT Pub. No.: WO2022/172735

PCT Pub. Date: Aug. 18, 2022

(65) Prior Publication Data

US 2024/0101772 A1 Mar. 28, 2024

(30) Foreign Application Priority Data

Feb. 10, 2021 (JP) ................................ 2021-019556
Mar. 17, 2021 (JP) ................................ 2021-043089
Nov. 29, 2021 (JP) ................................ 2021-192791
Nov. 29, 2021 (JP) ................................ 2021-192792

(51) Int. Cl.
*C08J 5/18* (2006.01)
*B32B 27/08* (2006.01)

(52) U.S. Cl.
CPC ................ *C08J 5/18* (2013.01); *B32B 27/08* (2013.01); *C08J 2329/04* (2013.01); *C08J 2367/00* (2013.01)

(58) Field of Classification Search
CPC .. B28B 1/30; C08J 5/18; C08J 2329/04; C08J 2367/00; C08J 2329/14; C08J 2367/02; C08J 2429/04; C08J 2429/14; C08J 2483/04; C08J 7/042; C08J 7/0427; C08J 7/04; Y02E 10/50; Y02W 30/62; B32B 27/08; B32B 7/022; B32B 27/14; B32B 27/30; B32B 27/36; B32B 2315/02; B32B 2457/00
See application file for complete search history.

(56) References Cited

U.S. PATENT DOCUMENTS 5,919,559 A 7/1999 Nakano et al.
11,059,276 B2 * 7/2021 Kolar .................... C08J 7/0427
2002/0009586 A1 1/2002 Isaki et al.
2005/0287380 A1 * 12/2005 Klein ...................... C08J 7/043 525/425
2009/0117395 A1 5/2009 Yakushidoh et al.
2012/0048348 A1 3/2012 Aritoshi et al.
2013/0240036 A1 9/2013 Hatakeyama
2018/0208811 A1 7/2018 Funatsu et al.
2019/0160728 A1 * 5/2019 Higashioji ............... B29D 7/01
2023/0150250 A1 * 5/2023 Suzuki .................... C08J 11/08 428/480

FOREIGN PATENT DOCUMENTS

JP 9-228231 A 9/1997
JP 2001-71420 A 3/2001
JP 2001-150620 A 6/2001
JP 2004-50681 A 2/2004
JP 2008-142960 A 6/2008
JP 2012-69769 A 4/2012
JP 2012-119676 A 6/2012
JP 2014-141557 A 8/2014
JP 2015-33811 A 2/2015
JP 2017-25172 A 2/2017
JP 2017-149005 A 8/2017
JP 2018-58270 A 4/2018
WO WO 2007/055225 A1 5/2007

OTHER PUBLICATIONS

Machine Translation of JP 2014-141577 A (Year: 2025).*
Machine Translation of JP2001-150620 A (Year: 2026).*
International Search Report, issued in PCT/JP2022/002364, PCT/ISA/210, dated Mar. 29, 2022.
Written Opinion of the International Searching Authority, issued in PCT/JP2022/002364, PCT/ISA/237, dated Mar. 29, 2022.

* cited by examiner

*Primary Examiner* — Scott R. Walshon
(74) *Attorney, Agent, or Firm* — Birch, Stewart, Kolasch & Birch, LLP

(57) ABSTRACT

Provided is a laminated polyester film that has high reusability and is suitable for processing during a post process. This laminated polyester film has a polyester film and a layer X that satisfies the following conditions. Condition 1: $20 \leq \gamma X_P \leq 45$ Condition 2: $3.05\gamma X_H \leq 10\gamma X_P$ (mN/m): Polar component of the surface free energy of the layer X $\gamma X_H$ (mN/m): Hydrogen bond component of the surface free energy of the layer X.

15 Claims, No Drawings

LAMINATED POLYESTER FILM, AND METHOD FOR PRODUCING POLYESTER FILM

TECHNICAL FIELD

The present invention relates to a laminated polyester film that is advantageous in that layers existing in the laminated polyester film can be removed easily.

BACKGROUND ART

Plastic materials are used in various fields, but on the other hand, they have been found to be a major cause of marine pollution, in the form of microplastics for example, and reduction of the environmental load caused by plastic materials has become an urgent issue. In recent years, furthermore, the evolution of the Internet of Things (IoT) has led to a rapid increase in the number of electronic devices, such as CPUs used in computers and smartphones, that are being manufactured currently and as a result, the production of multilayer ceramic capacitors (MLCCs), which are essential components for driving these electronic devices, is also growing explosively. In a generally known manufacturing method for MLCCs, a plastic film is used as substrate and a release layer is formed on the substrate to produce a release film. Then, a ceramic green sheet and electrodes are laid thereon and dried to ensure solidification, and the stack of layers is peeled off from the release film, followed by piling a plurality of such layer stacks and firing them. In carrying out this process, the release film is discarded as waste from the process.

Thus, as the amount of release film discarded as waste is swelling due to the explosive increase in the number of MLCCs manufactured in recent years, its load on the environment is now becoming a serious problem. To develop particular release properties, the components of release layers contained in release films adopted in the MLCC manufacturing process are usually different from those applied to the production of generally used films. If a release film with a release layer attached thereon is remelted without removing it, therefore, some components of the release layer will remain as foreign substances and make its recycling difficult.

To give a typical technique to recycle release films, Patent document 1 discloses a method in which a release film having a release layer is cleaned using a metal brush to permit the recycling of the release film deprived of the release layer. In addition, Patent document 2 discloses a method in which a water-soluble resin layer is provided between the release layer and the polyester film, and the release layer is removed by rinsing with water to permit the recycling of the film. In addition, Patent document 3 discloses a method in which good process conditions for forming a ceramic green sheet are set up in order to form a ceramic green sheet having high smoothness and peelability. Then, a water-soluble resin layer is inserted between the release layer and the polyester film, and the release layer is removed by rinsing with water to permit the recycling of the film.

PRIOR ART DOCUMENTS

Patent Documents

Patent document 1: Japanese Unexamined Patent Publication (Kokai) No. 2012-171276

Patent document 2: Japanese Patent No. 4284936

Patent document 3: Japanese Unexamined Patent Publication (Kokai) No. 2004-160773

SUMMARY OF INVENTION

Problems to be Solved by the Invention

In view of the explosive increase in the volume of newly manufactured MLCCs described above, it is important to reduce the load on the environment caused by the increased amount of release films that are discarded as waste. Accordingly, the laminated polyester films used in the substrates of release films are now required to be recyclable, and the films themselves are required to be processable in downstream processes.

In view of the above requirements, the inventors of the present invention examined the aforementioned conventional techniques and found that, in the case of the technique described in Patent document 1, the release layer cannot be removed uniformly and it takes a lot of time and trouble to achieve its recycling, posing a problem in terms of recyclability. The technique described in Patent document 2 was also found to be insufficient in recyclability. In the case of the technique described in Patent document 3, it was found that post-processability was poor under some process conditions and that there was room for improvement in recyclability.

In view of the above, an object of the present invention is to provide a laminated polyester film that is highly recyclable and suitable for processing in downstream processes.

Means of Solving the Problems

[I] A laminated polyester film including a polyester film and a layer X satisfying the requirements given below:

$$20 \leq \gamma X_P \leq 45, \text{ and} \qquad \text{requirement 1:}$$

$$3.0 \leq \gamma X_H \leq 10 \qquad \text{requirement 2:}$$

$\gamma X_P$ (mN/m): polar component of the surface free energy of the layer X, and $\gamma X_H$ (mN/m): hydrogen bond component of the surface free energy of the layer X.

[II] The laminated polyester film as set forth in [I], wherein the thickness xa (nm) of the layer X and the surface roughness RzjisB (nm) of the face (face B) of the polyester film that is opposite to the face (face A) having the layer X satisfy the requirement given below:

$$1.0 \leq RzjisB/xa \leq 20.0 \qquad \text{requirement 3:}$$

xa (nm): thickness of the layer X.

[III] The laminated polyester film as set forth in either [I] or [II], wherein the layer X satisfies the requirements given below:

$$20 \leq \gamma X_P \leq 30, \text{ and} \qquad \text{requirement 4:}$$

$$6.0 \leq \gamma X_H \leq 10. \qquad \text{requirement 5:}$$

[IV] The laminated polyester film as set forth in either [II] or [III], wherein the requirement given below is satisfied:

$$1.5 \leq RzjisB/xa \leq 10.0. \qquad \text{requirement 6:}$$

[V] The laminated polyester film as set forth in any one of [I] to [IV], wherein the thickness xa (nm) of the layer X and the surface roughness RzjisX (nm) of the layer X satisfy the requirement given below:

$$0.01 \leq RzjisX/xa \leq 3.0. \qquad \text{requirement 7:}$$

[VI] The laminated polyester film as set forth in any one of [I] to [V], wherein the thickness xa (nm) of the layer X is 10 nm or more and 500 nm or less.

[VII] The laminated polyester film as set forth in any one of [I] to [VI], wherein the water contact angles HX(1) (°) and HX(20) (°) on the layer X satisfy the requirement given below:

$$5 \leq |HX(1)-HX(20)| \leq 60 \quad \text{requirement 8:}$$

HX(1) (°): contact angle measured 1 second after the contact of water with the layer X, and HX(20) (°): contact angle measured 20 seconds after the contact of water with the layer X.

[VIII] The laminated polyester film as set forth in any one of [I] to [VII], wherein the layer X contains a resin having a polyvinyl alcohol skeleton.

[IX] The laminated polyester film as set forth in [VIII], wherein the layer X contains a resin having a sulfonate modified polyvinyl alcohol skeleton.

[X] The laminated polyester film as set forth in any one of [I] to [IX], wherein the layer X has a degree of crystallinity of 14% or more and 40% or less.

[XI] The laminated polyester film as set forth in [X], wherein the layer X has a degree of crystallinity of more than 31% and 40% or less.

[XII] The laminated polyester film as set forth in any one of [I] to [XI], wherein the layer X contains a resin having a degree of polymerization of more than 200.

[XIII] The laminated polyester film as set forth in any one of [I] to [XII], wherein a layer Y satisfying the requirements given below, a layer X, and a polyester film are stacked in this order:

$$80 \leq HY(1) \leq 120, \text{ and} \quad \text{requirement 9:}$$

$$1 \leq |HY(1)-HY(20)| \leq 90 \quad \text{requirement 10:}$$

HY(1) (°): contact angle measured 1 second after the contact of water with the layer Y, and HY(20) (°): contact angle measured 20 seconds after the contact of water with the layer Y.

[XIV] The laminated polyester film as set forth in [XIII], wherein the surface of the layer Y has a solvent durability ratio ratio of 5% or more and 100% or less as measured by the method described below:

[Measuring Method for Solvent Durability Ratio]

testing machine: Gakushin type testing machine (Type II rubbing tester specified in JIS L 0849 (2013))

friction block: cotton cloth (#3 muslin) soaked with a toluene-ethanol mixed solvent (1:1 by mass)

load: 1 kg number of times of rubbing motion: 30 times of to-and-fro motion $$\text{solvent durability ratio (\%)} = F(A)/F(B) \times 100$$

F(A): peel force for the surface of the layer Y, and

F(B): peel force for the surface of the layer Y after rubbing test with cloth soaked with solvent.

[XV] The laminated polyester film as set forth in [XIII] or [XIV], wherein the hydrogen bond component $\gamma Y_H$ of the surface free energy of the layer Y is 1.5 or more and 10 or less.

[XVI] The laminated polyester film as set forth in any one of [XIII] to [XV], designed to serve for release purpose wherein a layer to be released is formed on the face of the layer Y opposite to the face in contact with the layer X so that the layer to be released can be peeled off from the layer Y.

[XVII] The laminated polyester film as set forth in [XVI], designed to be used for an application in which the layer X and the layer Y are removed after peeling off the layer to be released from the layer Y.

[XVIII] The laminated polyester film as set forth in [XVII], wherein the laminated polyester film is to be recycled after removing the layer X and the layer Y.

[XIX] The laminated polyester film as set forth in any one of [XVI] to [XVIII], wherein the layer to be released is a ceramic green sheet containing barium titanate as primary component.

[XX] The laminated polyester film as set forth in any one of [I] to [XIX], designed to be used at least as part of a release film for a manufacturing process for a multilayer ceramic capacitor (MLCC).

[XXI] A laminated polyester film having, at least on either surface thereof, a layer Y satisfying the requirements given below:

$$80 \leq HY(1) \leq 120, \text{ and} \quad \text{requirement 11:}$$

$$1 \leq |HY(1)-HY(20)| \leq 90 \quad \text{requirement 12:}$$

HY(1) (°): contact angle measured 1 second after the contact of water with the layer Y, and HY(20) (°): contact angle measured 20 seconds after the contact of water with the layer Y.

[XXII] The laminated polyester film as set forth in any one of [I] to [XXI], wherein the polyester film has a three or more layered structure including a layer (layer A) constituting the face A that is either surface of the polyester film, a layer (layer B) constituting the face B that is the other surface thereof, and a layer (layer C) having no exposed face, with the layer C containing a recycled polyester material.

[XXIII] A production method fora polyester film using the laminated polyester film as set forth in [XXII] having at least a layer to be released, a layer Y, and a polyester film stacked in this order and including a step for peeling off the layer to be released from the layer Y, a step for removing the layer Y from the film deprived of the layer to be released, a step for producing a recycled material from the film deprived of the layer to be released and the layer Y, and a step for producing a film from the recycled material.

[XXIV] A laminated polyester film including a polyester film and a layer X containing a hydrophilic resin as primary component laid on either face (face A) thereof, wherein the thickness xa (nm) of the layer X and the surface roughness RzjisB (nm) of the face (face B) of the polyester film that is opposite to the face (face A) having the layer X satisfy the requirement given below:

$$0.2 \leq RzjisB/xa \leq 20.0. \quad \text{requirement 13:}$$

[XXV] A laminated polyester film including a polyester film and a layer X, wherein the layer X contains a resin having a sulfonate modified polyvinyl alcohol skeleton, with the degree of copolymerization with the sulfonate in the resin having a sulfonate modified polyvinyl alcohol skeleton being 0.1 mol % or more and 10 mol % or less, and wherein the layer X has an average degree of polymerization of 200 or more and 2,400 or less as determined by the average degree of polymerization measuring method specified in JIS K 6726 (1994) while the layer X has a degree of saponification of 30 or more and 97 or less as determined by the degree of saponification measuring method specified in JIS K 6726 (1994).

Advantageous Effects of the Invention

The present invention can provide a laminated polyester film that is highly recyclable and suitable for processing in downstream processes.

DESCRIPTION OF PREFERRED EMBODIMENTS

The present invention will be described in more detail below with reference to specific examples.

The present invention relates to a laminated polyester film that has a polyester film and one or more additional layers. The polyester referred to for the present invention contains a dicarboxylic acid component and a diol component. A component as referred to herein is a minimum unit that can be produced through hydrolysis of a polyester. Examples of the dicarboxylic acid component that can form a polyester include aromatic dicarboxylic acids such as terephthalic acid, isophthalic acid, phthalic acid, 1,4-naphthalene dicarboxylic acid, 1,5-naphthalene dicarboxylic acid, 2,6-naphthalene dicarboxylic acid, 1,8-naphthalene dicarboxylic acid, 4,4'-diphenyl dicarboxylic acid, and 4,4'-diphenyl ether dicarboxylic acid, as well as ester derivatives thereof.

Examples of the diol component that can form a polyester include aliphatic diols such as ethylene glycol, 1,2-propanediol, 1,3-propanediol, 1,4-butanediol, 1,2-butanediol, and 1,3-butanediol; alicyclic diols such as cyclohexane dimethanol and spiroglycol; and combinations of a plurality thereof connected to each other. In particular, polyesters that are preferable from the viewpoint of mechanical properties and transparency include polyethylene terephthalate (PET), polyethylene-2,6-naphthalene dicarboxylate (PEN), PET with part of the dicarboxylic acid components copolymerized with isophthalic acid or naphthalene dicarboxylic acid, and PET with part of the diol components copolymerized with cyclohexane dimethanol, spiroglycol, or diethylene glycol.

A preferred embodiment of the laminated polyester film according to the present invention is a laminated polyester film having a polyester film and a layer X satisfying the requirements 1 and 2 given below and, from the viewpoint of structural simplicity and increased productivity, a more preferred embodiment is a laminated polyester film having a polyester film and a layer X satisfying the requirements given below 1 and 2 disposed on at least one face thereof.

$$20 \leq \gamma X_P \leq 45, \text{ and} \qquad \text{requirement 1:}$$

$$3.0 \leq \gamma X_H \leq 10 \qquad \text{requirement 2:}$$

$\gamma X_P$ (mN/m): polar component of the surface free energy of the layer X, and $\gamma X_H$ (mN/m): hydrogen bond component of the surface free energy of the layer X.

The polar component of the surface free energy $\gamma X_P$ and the hydrogen bond component of the surface free energy $\gamma X_H$ are values determined by measuring the static contact angle at 25° C. of glycerol, ethylene glycol, formamide, and diiodomethane on the surface of the layer X in the laminated polyester film, introducing the static contact angle of each liquid and the variance component, polarity component, and hydrogen bond component of the surface free energy of each liquid described in Non-patent document 1 given below into the extended Hawks equation proposed by Hata and Kitazaki in Non-patent document 2 given below, and solving the simultaneous equations. The measuring method to use will be described in detail later. Here, in the case where the layer X is not exposed, the surface free energy of the layer X is measured after exposing the layer X by polishing until the thickness of the layer X is decreased to a value in the range of 30% to 70% of the original thickness of the layer X.

Non-patent document 1: J. Panzer, J. Colloid Interface Sci., 44,142 (1973)

Non-patent document 2: Yasuaki Kitazaki and Toshio Hata, J. Adhesion Society of Japan, 8, (3) 131 (1972)

If the polarity component $\gamma X_P$ and hydrogen bond component $\gamma X_H$ of the surface free energy are in the specified ranges, it serves to enhance the internal interaction in the layer X itself and the interaction between the layer X and the laminated polyester film, which improves the solvent resistance and promotes easy absorption of water by the layer X. Accordingly, this allows the layer X to be removed easily from the laminated polyester film by means of washing with water or an aqueous solution. Here, high solvent resistance as referred to herein means that the laminated polyester film will not suffer a significant deterioration in smoothness and rinsability when, for example, the layer X is coated with a release layer using a coating material containing a solvent, which may be followed by additional coating with a ceramic green sheet using a slurry containing a solvent. From the same point of view, $\gamma X_P$ is more preferably 20 mN/m or more and 30 mN/m or less, and still more preferably 22 mN/m or more and 28 mN/m or less, while $\gamma X_H$ is more preferably 4.0 mN/m or more and 10 mN/m or less, still more preferably 6.0 mN/m or more and 10 mN/m or less, and particularly preferably 7 mN/m or more and 9 mN/m or less.

In a preferred embodiment for the case where a resin having a polyvinyl alcohol skeleton is used to form the layer X, an ionic polar group such as carboxylate, sulfonate, and tertiary ammonium salt is introduced as a side chain group in order to allow the polar component $\gamma X_P$ and the hydrogen bond component $\gamma X_H$ to be in the above ranges. In particular, the use of a sulfonate is preferable from the viewpoint of water solubility and solvent resistance. Accordingly, it is more preferable for the layer X to contain a resin having a sulfonate modified polyvinyl alcohol skeleton. In relation to the degree of copolymerization, it preferably accounts for 0.1 mol % or more and 10 mol % or less, more preferably 0.5 mol % or more and 10 mol % or less, still more preferably 0.5 mol % or more and 5.0 mol % or less, and particularly preferably 1.0 mol % or more and 3.0 mol % or less, of the total quantity of the resin having a polyvinyl alcohol skeleton. In addition, it preferably has a degree of polymerization of more than 200 and 1,000 or less, more preferably 300 or more and 1,000 or less, and still more preferably 400 or more and 600 or less. It also preferably has a degree of saponification of 30 or more and 90 or less, more preferably 60 or more and 88 or less. Furthermore, if the degree of copolymerization, degree of polymerization, and degree of saponification are in the ranges described above, that makes it easier to control the polarity component $\gamma X_P$ and hydrogen bond component $\gamma X_H$ of the surface free energy of the layer X in the ranges described above.

For the laminated polyester film according to the present invention, it is preferable that the absolute value of the difference between the contact angle HX(1) measured 1 second after the contact of water with the layer X and the contact angle HX(20) measured 20 seconds after the contact, i.e. $|HX(1)-HX(20)|$, be 5° or more and 60° or less. The value of $|HX(1)-HX(20)|$ shows the change in water contact angle that occurs between the start and end of the specified period of time. If the value is small, it suggests that the change in water contact angle that occurs between the start and end of the specified period of time is small whereas if the value is large, it suggests that the change in water contact angle that occurs between the start and end of the specified period of time is large. Controlling the value of |HX(1)−HX(20)| at 5° or more serves to allow the layer X to have a high water absorption rate and make it easy to wash it with water. On the other hand, controlling the value of |HX(1)−HX(20)| at 60° or less serves to allow the layer X to be formed stably. Furthermore, controlling the value of |HX(1)−HX(20)| at 10° or more and 30° or less serves to prevent localization and improve washing efficiency. From the above point of view, it is more preferably 10° or more and 25° or less. From the above point of view, furthermore, it is more preferable that the following relation be satisfied: HX(1)−HX(20)≥0°.

The layer X in the laminated polyester film according to the present invention preferably contains a water-soluble material. If the layer X contains a water-soluble material, that makes it easy to control the value of |HX(1)−HX(20)| in the preferable range. If the layer X contains a water-soluble material, washing the laminated polyester film, which contains the layer X, with water works to allow the layer X to be dissolved in water easily so that the layer X along with the layers laid on and above the layer X will be removed and accordingly, a polyester film with high purity will be obtained. It is preferable for the water-soluble material to account for 60 mass % or more, more preferably 90 mass % or more, and still more preferably 95 mass % or more, of the entire layer X, and particularly preferably it consists only of water-soluble components. Here, in order to obtain a high purity polyester film, it is preferable that the layer X and the polyester film be in contact with each other.

Examples of such a water-soluble material include a resin having a water-soluble polyester skeleton, resin having a polyester urethane skeleton, resin having a polyvinyl alcohol skeleton (hereinafter, polyvinyl alcohol will be occasionally referred to as PVA), resin having a polyvinyl pyrrolidone skeleton (hereinafter, polyvinyl pyrrolidone will be occasionally referred to as PVP), and material containing starch as primary component. A water-soluble material as referred to herein is defined as one that undergoes a change in mass of 15% or more when immersed in water at 50° C. for 10 minutes to form an aqueous solution. In more detail, it is measured by the procedure described below. Specifically, to determine whether a resin is water soluble, it is immersed in water at 50° C. for 10 minutes, taken out of water, wiped with cloth to sufficiently remove the water on the surface, and weighed to measure its mass, and the change in mass ΔM is calculated by the formula given below. It should be 15% or more and an aqueous solution should be formed.

$$\Delta M=|(M2-M1)|/M1\times 100(\%)$$

M1 (g): mass of the resin before immersion in water at 50° C. for 10 minutes, and M2 (g): mass of the resin after immersion in water at 50° C. for 10 minutes Here, the primary component refers to a component that accounts for 60 mass % or more in the layer, which accounts for 100 mass %.

From the viewpoint of affinity with the polyester film, solubility in water, and resistance to solvents, the layer X preferably contains a resin having a polyvinyl alcohol skeleton, and more preferably the layer X is made only of a resin having a polyvinyl alcohol skeleton. The use of a resin having a PVA skeleton is preferable particularly because the number of nonpolar sites is small and a large number of hydrophilic groups are contained to ensure a high water solubility and also because it has solvent resistance.

In the case where a resin having a polyvinyl alcohol skeleton is used to form the layer X, it preferably has a degree of polymerization of more than 200 and 1,000 or less, more preferably 300 or more and 1,000 or less, and still more preferably 400 or more and 600 or less. If the degree of polymerization is controlled at 1,000 or less, it means that the polyvinyl alcohol has long molecular chains and the packing inside molecular chains is suppressed, leading to a low degree of crystallinity and allowing the layer X to be highly soluble. On the other hand, if the degree of polymerization is controlled at more than 200, it ensures a high coatability during the formation of the layer X by a coating technique and serves to prevent its localization on the film from being caused by a low coatability and avoid an increase in the degree of crystallinity that may cause deterioration in rinsability. Here, the degree of polymerization means the average degree of polymerization that is determined according to JIS K 6726 (1994).

From the same point of view, in the case where the layer X contains a resin having a polyvinyl alcohol skeleton and its average degree of polymerization is measured by examining the layer X by the method described in JIS K 6726 (1994), the measured average degree of polymerization is preferably more than 200 and 1,000 or less, more preferably 300 or more and 1,000 or less, and still more preferably 400 or more and 600 or less.

Furthermore, from the viewpoint described above, it is preferable for the resin having a polyvinyl alcohol skeleton in the layer X to account for 60 mass % or more, more preferably 90 mass % or more, and still more preferably 95 mass % or more, of the whole layer X, and particularly preferably it consists only of a resin having a polyvinyl alcohol skeleton. In addition, it is preferable for the layer X to have water solubility.

In the case where a resin having a polyvinyl alcohol skeleton is used to form the layer X, it preferably has a degree of saponification of 30 or more and 90 or less, more preferably 60 or more and 88 or less. The polyvinyl alcohol at least contains hydroxyl groups and acetic acid groups as side chains, and as the degree of saponification increases, the number of hydroxyl groups, which are smaller in size and act as functional groups, increases while the number of acetic acid groups decreases. Accordingly, as the degree of saponification increases, crystallization caused by molecular chain packing tends to be accelerated. If the degree of saponification is 90 or less, the degree of crystallinity can be decreased, thereby increasing the rinsability. On the other hand, if the degree of saponification is 30 or more, the number of acetic acid groups can be decreased below an appropriate level, which leads to an increased rinsability. Furthermore, the value of |HX(1)−HX(20)| can be controlled easily in the preferable range to ensure a higher solvent resistance.

It is also preferable that a resin having a copolymeric polyvinyl alcohol containing a functional group other than the hydroxyl group and acetic acid group copolymerized to form side chains be adopted as the resin having a polyvinyl alcohol skeleton that is used to form the layer X. In particular, the introduction of a bulky hydrophilic functional group such as sulfonate can serve to easily control the values of $\gamma_{X_P}$, $\gamma_{X_H}$, and |HX(1)-HX(20)| in preferable ranges. Among others, the use of a sulfonate is preferable from the viewpoint of water solubility and solvent resistance. This means that it is preferable for the layer X to contain a resin having a sulfonate modified polyvinyl alcohol skeleton. In terms of the degree of copolymerization, it preferably accounts for 0.1 mol % or more and 10 mol % or less, more preferably 0.5 mol % or more and 5.0 mol % or less, and still more preferably 1.0 mol % or more and 3.0 mol % or less, of the total quantity of the resin having a polyvinyl alcohol skeleton. If the degree of polymerization is in the range specified above, it ensures a high coatability during the formation of the layer X by a coating technique and serves to prevent its localization on the film and avoid an excessive increase in the degree of crystallinity.

It is preferable to adopt sodium sulfonate as the sulfonate to use as the copolymerization component. Here, when a sodium salt is adopted as a copolymerization component, sodium can be supplied from the sodium hydroxide used as alkali material for saponification.

In the case where a resin having a polyvinyl alcohol skeleton is used as material for the layer X, it is preferable for the layer X to be free of an acrylic resin and polyester resin that can act as a binder and also free of such resins as melamine and oxazoline that can act to enhance the cross-linking action to accelerate the film formation process. A resin that can work as a binder or a crosslinker tends to interact with the hydroxyl groups existing in side chains in the resin having a polyvinyl alcohol skeleton to make it difficult to control the value of $|HX(1)-HX(20)|$ in a preferable range.

The layer X in the laminated polyester film according to the present invention preferably has a degree of crystallinity of 14% or more and 40% or less, more preferably 15% or more and 40% or less, and still more preferably more than 31% and 40% or less. The degree of crystallinity generally represents the degree of crystallization of a substance, and a higher degree of crystallinity means that the substance contains a larger volume of crystals that are stable in terms of free energy. Accordingly, as the degree of crystallinity increases, the substance itself increases in stability. If the degree of crystallinity is controlled at 15% or more, it serves to ensure an increased solvent resistance. On the other hand, if the degree of crystallinity is controlled at 40% or less, it serves to ensure an increased rinsability. Furthermore, it allows the value of $|HX(1)-HX(20)|$ to be controlled easily in a preferable range. In addition, if the degree of copolymerization, degree of polymerization, and degree of saponification are in the preferable ranges described above, that makes it easier to control the degree of crystallinity of the layer X in the range described above.

Here, the degree of crystallinity of the layer X is determined by the method described in the section EXAMPLE.

One of the preferred embodiments of the laminated polyester film according to the present invention is a laminated polyester film having a polyester film and a layer X wherein the thickness xa (nm) of the layer X and the surface roughness RzjisB (nm) of the face (face B) of the aforementioned polyester film that is opposite to the face (face A) having the layer X satisfy the requirement given below:

$$0.2 \leq RzjisB/xa \leq 20.0. \quad \text{requirement:}$$

In particular, from the viewpoint of structural simplicity and increased productivity, a more preferred embodiment is one in which the surface of the aforementioned opposite face (face B) coincides with the face (face B) of the aforementioned polyester film that is opposite to the face (face A) having the layer X. In addition, from the viewpoint of increasing the rinsability, other preferred embodiments than those given above can be proposed wherein the layer X is a layer X that satisfies the performance requirement described above or wherein the layer X has hydrophilicity. Here, the expression "the layer X has hydrophilicity" means that it has a surface free energy of 10 mN/m or more as measured by the method described in the section EXAMPLE. In the case where the layer X is not exposed, the surface free energy of the layer X is measured after exposing the layer X by performing polishing until its thickness is decreased to a value in the range of 30% to 70% of the original thickness of the layer X.

Under some storage conditions, such as where the film having such a layer X is wound in a roll shape with a surface pressure applied to the film and stored in a high moisture, high temperature atmosphere, the film may suffer a large change in characteristics, possibly leading to problems when using the film. The occurrence of such a change in characteristics can be suppressed largely by using a film that has a layer X and satisfies the requirement 3. This will be described in more detail below.

If the laminated polyester film according to the present invention is wound in a roll shape, the layer X will come in contact with the surface of the face (face B) of the polyester film that is opposite to the face (face A) having the layer X. RzjisB represents the average of 10 roughness measurements taken by the method described in the section EXAMPLE, and an increase in this value means that the surface has larger irregularities. In the case where the value of RzjisB/xa is as small as less than 0.2, which suggests a small RzjisB, a large xa, or both, and where a pressure is applied to the film surface in a roll stored in a high moisture, high temperature atmosphere, the layer X tends to adhere to the surface of the face B, and the layer X is occasionally transferred to the surface of the face B. In addition, the shape of the layer X may be deformed to cause a decrease in the rinsability of the layer X, and when another layer is formed in contact with the layer X, it may cause deterioration in the coatability, function, etc. of that layer.

In the case where the value of RzjisB/xa is as large as more than 20.0, which suggests a large RzjisB, a small xa, or both, and where a pressure is applied to the film surface in a roll stored in a high moisture, high temperature atmosphere, the shape of the layer X may be deformed by the irregularities of the surface of the face B to cause deterioration in the rinsability of the layer X. Furthermore, when another layer is formed in contact with the layer X, it may cause deterioration in the coatability, function, etc. of that layer. From the same point of view as above, the value of RzjisB/xa is more preferably 1.0 or more and 10.0 or less, still more preferably 1.5 or more and 10.0 or less, and particularly preferably 3.0 or more and 8.5 or less.

For the laminated polyester film according to the present invention, it is preferable that the thickness xa (nm) of the layer X and the surface roughness RzjisX (nm) of the layer X satisfy the requirement 7 given below:

$$0.01 \leq RzjisX/xa \leq 3.0. \quad \text{requirement 7:}$$

RzjisX represents the surface roughness RzjisX of the layer X and represents the average of 10 roughness measurements taken by the method described in the section EXAMPLE. In the case of a two layered structure consisting of a layer X and a polyester film, RzjisX represents the roughness of the face of the layer X that is opposite to the face in contact with the polyester film. The roughness of the layer X is influenced by the roughness of the face A of the polyester film, but if RzjisX/xa is controlled at 3.0 or less, it serves to allow the layer X to cover the entire surface of the face A, thereby increasing the hydrophilicity of the layer X. Furthermore, in the case where another layer is formed in contact with the layer X, it serves to allow that layer to develop coatability and other functions sufficiently.

If RzjisX/xa is 0.01 or more, it serves to allow the film to have high handleability. From the same point of view as above, the value of RzjisX/xa is more preferably 0.5 or more and 1.5 or less.

For the laminated polyester film according to the present invention, it is preferable for the layer X to have a thickness xa of 10 nm or more and 500 nm or less. If xa is controlled at 10 nm or more, it serves to satisfy the requirement 3 and requirement 7 easily, leading to a high productivity. On the other hand, if xa is 500 or less, it ensures a high coatability when forming the layer X by a coating technique.

Another preferred embodiment that can be cited here is a laminated polyester film having, at least on either surface thereof, a layer Y satisfying the formulae given below. In particular, in order to further increase the rinsability, it is more preferable for the laminated polyester film to include a layer Y satisfying the formulae given below, a layer X, and a polyester film in this order, and it is particularly preferable for the laminated polyester film to include a layer Y satisfying the formulae given below on the face of the layer X opposite to the face in contact with the polyester film.

$$80 \leq HY(1) \leq 120,\ 1 \leq |HY(1)-HY(20)| \leq 90$$

HY(1) (°): contact angle measured 1 second after the contact of water with the layer Y, and HY(20) (°): contact angle measured 20 seconds after the contact of water with the layer Y If the water contact angle is properly controlled so that the layer Y has a HY(1) in the range given above, it serves to decrease the surface energy of the layer Y to allow the laminated polyester film having the layer Y to work as a release film.

Specifically, if the water contact angle is properly controlled to satisfy the relation 80 HY(1), it ensures a sufficiently high releasability to allow the laminated polyester film having the layer Y to be applied suitably as a release film. In the case where HY(1) 120, furthermore, when a layer to be released is formed by a coating technique, the repellency to the coating material used to form the layer to be released decreases to prevent coating defects such as pinholes from being developed in the layer to be released. From the same point of view, HY(1) is more preferably 85° or more and 110° or less.

Furthermore, if HY(20) can change relative to HY(1) so that the value of |HY(1)−HY(20)| comes in the above range, it serves to allow the physical properties of the layer Y to be changed by means of water. This means that altering the physical properties by means of water to change the adhesiveness between the layer Y and the laminated polyester film can make it easy to remove the layer Y from the laminated polyester film using water.

The relation 1≤|HY(1)−HY(20)| specifically means that the layer Y permeates water. When the relation 1≤|HY(1)−HY(20)| is satisfied, water penetrates more rapidly into the polyester film used as substrate to cause peeling more easily between the surface of the substrate and the other layers. This serves to allow the layer Y to be removed easily from the laminated polyester film by means of water to ensure that it can be recycled. From the same point of view, it is more preferable to satisfy the relation 5≤|HY(1)−HY(20)|. Furthermore, if the relation |HY(1)−HY(20)|≤90 is satisfied, it serves to allow the layer Y to have stable physical properties, thereby preventing the layer Y from being deteriorated by water vapor etc. In addition, it is more preferable that the relation |HY(1)−HY(20)|≤30 be satisfied because it facilitates the formation of another layer on the layer Y, and when such another layer is formed on the layer Y, it serves to prevent a local deterioration in rinsability from being caused by modification, localization, etc. of the layer Y. From the same point of view as above, it is still more preferable for the value of |HY(1)−HY(20)| to be 5° or more and 25° or less. From the point of view described above, furthermore, it is preferable that the relation HY(1)−HY(20)≥0 be satisfied.

There are no specific limitations on the method to use to control the value of |HY(1)−HY(20)| of the layer Y in the preferable range described above, but according to preferred embodiments, examples thereof include a method that adopts a layer Y containing a resin and a surface active agent as described later and a method designed to adopt a laminated polyester film including a polyester film provided, at least on either face thereof, with a layer X in which the polarity component $\gamma X_P$ of the surface free energy is 20 mN/m or more and 30 mN/m or less while the hydrogen bond component $\gamma X_H$ of the surface free energy is 6.0 mN/m or more and 10 mN/m or less, wherein a layer Y is added on the face of the layer X opposite to the face in contact with the polyester film.

If the layer X having a surface free energy in the range specified above is in contact with the layer Y, it helps the water located on the layer Y to penetrate through the layer Y, thereby working to increase the value of |HY(1)−HY(20)|. As the water repellency of the layer Y increases and as the water permeability of the layer Y increases, the value of |HY(1)−HY(20)| can be increased.

For the laminated polyester film including a substrate and a layer Y located thereon, it is preferable for the layer Y to be made of one or more resin compounds selected from the group consisting of silicone compounds having a dimethyl siloxane skeleton, compounds having a long chain alkyl group, compounds having a polyolefin skeleton, and fluorine-containing compounds such as compounds having a perfluoroalkyl group. In particular, compounds having a polyolefin skeleton can be used suitably. Compounds having a polyolefin chain as main skeleton tend to be high in compatibility with such surface active agents as described later and accordingly serve to easily control the value of |HY(1)−HY(20)| in the range specified above. Examples of a compound having a polyolefin skeleton include polyethylene, polypropylene, polybutadiene, hydrogenated polybutadiene, polyisoprene, hydrogenated polyisoprene, polyisobutylene, and α-olefins, which may be used singly in the form of homopolymers or in combination of a plurality thereof in the form of copolymers. An α-olefin is an olefin that has a double bond at either end of the molecular chain, and examples thereof include 1-octene.

In the case where a compound having a polyolefin skeleton is used to form the layer Y in a laminated polyester film that includes a substrate and a layer Y located thereon, it is preferable for the layer Y to contain a surface active agent. In this embodiment, water penetrating the layer Y will expand rapidly over the surface of the substrate to ensure that the relation 1≤|HY(1)−HY(20)| will be satisfied easily. It is preferable that the surface active agent added account for 0.5 part by mass or more and 4 parts by mass or less, more preferably 1 part by mass or more and 2 parts by mass or less, relative to 100 parts by mass of the compound having a polyolefin skeleton. If the surface active agent accounts for 0.5 part by mass or more, the amount of the surface active agent will be large enough to expand over the entire surface of the layer Y, allowing the water to penetrate through the layer Y easily. If the surface active agent accounts for more than 4 parts by mass, the surface active agent may concentrate on the surface of the layer Y to contaminate the object to be released.

As useful surface active agents to be added to the layer Y in a laminated polyester film that includes a substrate and a layer Y located thereon, there are various nonionic surface active agents including, for example, polyoxyethylene alkyl phenyl ethers such as polyoxyethylene lauryl ether, polyoxyethylene cetyl ether, polyoxyethylene stearyl ether, and polyoxyethylene oleyl ether; polyoxyethylene alkyl phenyl ethers such as polyoxyethylene octyl phenyl ether and polyoxyethylene nonyl phenyl ether; polyoxyethylene fatty acid esters such as polyoxyethylene monolaurate, polyoxyethylene monostearate, and polyoxyethylene monooleate; sorbitan fatty acid esters such as sorbitan monolaurate, sorbitan monopalmitate, sorbitan monostearate, and sorbitan monooleate; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan triisostearate, polyoxyethylene sorbitan monooleate, and polyoxyethylene sorbitan trioleate; and others such as polyoxyethylene glyceryl ether fatty acid esters and polyoxyethylene-polyoxypropylene block copolymer. These nonionic surface active agents may be used singly or as a combination of two or more thereof.

For the laminated polyester film including a substrate, a layer X, and a layer Y, silicone compounds having dimethyl siloxane skeletons, compounds having long chain alkyl groups, and compounds containing fluorine can be proposed to serve as the highly water repellent resin to form the layer Y. Of these, the use of a silicone having a dimethyl siloxane skeleton (organopolysiloxane) having high water permeability is preferable, and it is particularly preferable to use a cured resin having a silicone skeleton. Cured resins having silicone skeletons include "addition reaction" type ones formed by heat-curing an organo hydrogen polysiloxane and an organopolysiloxane having an alkenyl group in the presence of a platinum catalyst, "condensation reaction" type ones formed by heat-curing an organo hydrogen polysiloxane and an organopolysiloxane having a terminal hydroxyl group using an organotin catalyst, "UV cured" type ones formed by mixing an organopolysiloxane having an acryloyl group or methacryloyl group or an organopolysiloxane having an alkenyl group and an organopolysiloxane having a mercapto group, adding a photopolymerization initiator, and applying UV light to achieve curing, and "cationic polymerization" type ones formed by photo-ring-opening of an epoxy group using an onium salt initiator to achieve curing. Any of the above ones can work, but the use of an addition reaction type one or a UV cured type one is preferable from the viewpoint of productivity and peel force.

Specific examples of preferable addition reaction type resins having a silicone skeleton include those containing polydimethyl siloxane having a terminal vinyl group and hydrogen siloxane, such as KS-847, KS-847T, KS-841, KS-774, KS-3703T, and X-62-2825, all manufactured by Shin-Etsu Chemical Co., Ltd., and SD7333, SRX357, SRX345, LTC310, LTC303E, LTC300B, LTC350G, LTC750A, LTC851, LTC759, LTC755, LTC761, and LTC856, all manufactured by Dow Toray Co., Ltd. (here, LTC is a registered trademark).

Specific examples of preferable condensation reaction type resins having a silicone skeleton and catalysts include those containing polydimethyl siloxane having a terminal hydroxyl group, hydrogen siloxane, and an organotin catalyst, such as SRX290 and SY LOFF23, both manufactured by Dow Toray Co., Ltd.

Specific examples of preferable UV cured type resins having a silicone skeleton and catalysts include those containing organopolysiloxane having an acryloyl group or a methacryloyl group and a photopolymerization initiator and those containing polydimethyl siloxane having an alkenyl group, polydimethyl siloxane having a mercapto group, and a photopolymerization initiator, such as FM-0711, FM-0721, FM-0725, FM-7711, FM-7721, and FM-7725, all manufactured by JNC Corporation, and BY24-510H and BY24-544, both manufactured by Dow Toray Co., Ltd.

Specific examples of preferable cationic polymerization type resins having a silicone skeleton and catalysts include those containing siloxane having an epoxy group and an onium salt initiator, such as TPR6501, UV9300, and XS56-A2775, all manufactured by Momentive Performance Materials Inc.

In addition, for the laminated polyester film according to the present invention, it is preferable for the surface of the layer Y to have a solvent durability ratio of 5% or more and 100% or less. It is more preferably 10% or more and 100% or less. When the surface of the layer Y in a laminated polyester film is subjected to abrasion test with a solvent, solvent durability ratio is calculated by dividing the peel force for the surface of the layer Y by the peel force for the surface of the layer Y measured after the abrasion test. The measuring method to use will be described in detail later. A higher solvent durability ratio means a higher solvent resistance and serves to suppress the decrease in smoothness in downstream processes and prevent deterioration in removability with water. The practical upper limit of the solvent durability ratio is 100%. If a highly removable resin is used with an aim of increasing the recyclability, it tends to lead to a decrease in the solvent durability ratio. If the solvent durability ratio is controlled in the range specified above while maintaining the value of $|HY(1)-HY(20)|$ in the range specified above, it serves to ensure a high solvent resistance while achieving a high recyclability.

In addition, for the laminated polyester film according to the present invention, it is preferable for the surface free energy of the layer Y to have a hydrogen bond component $\gamma Y_H$ of 1.5 mN/m or more and 10 mN/m or less, more preferably 1.5 mN/m or more and 5.0 mN/m or less. If $\gamma Y_H$ is in the range, the layer Y will be higher in permeability to water, and this serves to not only to ensure a high removability of the layer Y when washing with water, but also allows water to penetrate through the layer Y and work on layers nearer to the substrate to achieve easier removal of layers disposed on the substrate. In particular, when a layer X coexists, water penetrating the layer Y will work more strongly to remove the layer X, and as a result, it will be easy to remove both the layer X and the layer Y from the laminated polyester film.

For the laminated polyester film according to the present invention, the features described above can be helpful in the case where a layer to be released is to be formed on the face of the layer Y opposite to the face in contact with the layer X or the substrate so that the layer to be released can be peeled off from the layer Y to allow the laminated polyester film to serve for release purpose. Furthermore, since the layer X and the layer Y can be removed from the laminated polyester film according to the present invention using water, it is possible to obtain a high purity polyester film by removing the layer X and the layer Y after peeling off the object to be released. In addition, for the laminated polyester film according to the present invention, it is preferable that after removing the layer X and the layer Y, a high purity polyester film be taken out and recycled. Here, it is more preferable that after removing the layer X and the layer Y, only the polyester film be taken out to be recycled. To recycle it, a layer X and a layer Y may be formed again on the polyester film taken out above so that it can be used as a release film or the polyester film may be remelted and molded again into a polyester film. If it is remelted and molded again into a polyester film, it is preferable because purposes of the recycled film will not be limited particularly and it can be used for various applications to contribute effectively to reduction in environment load.

When a silicone compound, a compound having a dimethyl siloxane bond in particular, is used to form the layer Y in the laminated polyester film according to the present invention, the component having a dimethyl siloxane bond tends to mix with the polyester film to form a foreign object when being remelted, and it may promote the degradation of polyester or make extrusion molding impossible after melting. Thus, it is preferable for the layer Y to be removed in order to allow the film according to the present invention to be recycled efficiently after remelting.

When the laminated polyester film according to the present invention that has a layer X and a layer Y is used as a release film, the layer to be released may be a sheet of an organic adhesive containing an acrylate as primary component or a sheet of an inorganic substance containing a metal or a metal oxide as primary component. In particular, barium titanate, which is a metal oxide, is an essential material for producing an MLCC, and the consumption of process release films is now increasing for the production of barium titanate sheets. Under such circumstances, if the laminated polyester film according to the present invention that has a layer X and a layer Y is used in a process for producing barium titanate sheets, the laminated polyester film according to the present invention can be recycled by removing the layer X and the layer Y after the production of barium titanate sheets to obtain a high purity polyester film, thus contributing effectively to reduction in environment load.

The production method for a laminated polyester film according to the present invention will be described below, but the present invention should not be construed as being limited to the laminated polyester film that can be produced by this method.

More specifically, the polyester film existing in the laminated polyester film according to the present invention can be produced by heating and melting a raw material, which is dried as required, in an extruder and extruded from the nozzle onto a cooled casting drum to form a sheet (melt casting method). To produce this sheet, it is preferable to bring the material electrostatically into contact with a drum having a surface cooled at a temperature of 20° C. or more and 60° C. or less so that the sheet is cooled and solidified into an unstretched film. It is preferable for the casting drum to have a temperature of 20° C. or more and 40° C. or less, more preferably 20° C. or more and 30° C. or less.

Next, the unstretched sheet is maintained at a temperature T1n (° C.) that satisfies the following formula (i) and biaxially stretched to ratios of 3.6 or more in the machine direction (MD) of the film, 3.9 or more in the transverse direction (TD) of the film, and 14.0 or more and 20.0 or less in area.

The stretching ratio in the transverse direction of the film is preferably 4.0 or more, more preferably 4.3 or more and 5.0 or less. If the film is stretched in the transverse direction to a ratio of 4.0 or more and coated with a layer X after the uniaxial stretching by means of the in-line coating technique that will be described later, the components existing in the layer X will be stretched and elongated together with the film, and this prevents the components existing in the layer X from aligning regularly and serves to allow the degree of crystallinity of the layer X to stay in the preferable range. If the ratio of stretching in the transverse direction is more than 5.0, the film formation property will deteriorate in some cases.

$$Tg(°\,C.) \le T1n(°\,C.) \le Tg+40(°\,C.) \quad \text{(i)}$$

Tg: glass transition temperature (° C.) of the polyester film

To stretch the film in the machine direction, the technique of moving it to travel between rollers rotating at different speeds has been used suitably. In this case, it is preferable that the film be fixed by a nip roller designed to prevent the film from slipping and stretching be performed in a plurality of sections.

Next, it is preferable for the biaxially stretched film to be subjected to heat fixation treatment at a temperature (Th0 (° C.)) that satisfies the formula (ii) given below for 1 second or more and 30 seconds or less, followed by uniform slow cooling and additional cooling to room temperature to provide a polyester film.

$$Tmf-35(°\,C.) \le Th0(°\,C.) \le Tmf(°\,C.) \quad \text{(ii)}$$

Tmf: melting point (° C.) of the film

If a biaxially stretched film is prepared under conditions where the formula (ii) is satisfied, it serves to allow the film to have a moderate degree of orientation and show an improved handleability when used as a release film.

In addition to the features of the production method described above, the polyester film existing in the laminated polyester film according to the present invention preferably contains particles so that the film can stay in the ranges specified by the requirement 3 and the requirement 7. Suitable particles to be contained are spherical ones having a uniform particle size distribution, and examples thereof include colloidal silica particles, crosslinked polystyrene particles, and calcium carbonate particles. These particles preferably account for 0.01 mass % or more and 3.0 mass % or less of the mass of the polyester film. In addition, the diameters of the particles are preferably 50 nm or more and 5,000 nm or less. To satisfy the requirement 6, the particles have a particle diameter of 100 nm or more and 5,000 nm or less, particularly preferably 300 nm or more and 2,000 nm or less. To satisfy the requirement 7, the particles have a particle diameter of 50 nm or more and 1,000 nm or less, particularly preferably 50 nm or more and 400 nm or less. To allow the polyester film used for the present invention to stay in the preferable ranges specified by the requirement 6 and the requirement 7, the sheet extruded on the cast drum preferably has a two or more layered structure and more preferably has a three or more layered structure including a layer (layer A) that forms the face A, a layer (layer B) that forms the face B, and an intermediate layer (layer C) disposed between them. In particular, the structure having an intermediate layer (layer C) between the layer A and the layer B is preferable because a material recycled by the method described later can be used to form the layer C.

Next, a method to form a layer X and a layer Y on the polyester film existing in the laminated polyester film according to the present invention will be described below, but the present invention should not be construed as being limited to the films that can be produced by using this method.

In the case where the layer X is to be formed using a resin that absorbs water easily, a preferable method is to dissolve the resin adopted to form the layer X in water and spread it over the polyester film used for the present invention. Useful coating methods include generally known coating techniques such as gravure coating, Meyer bar coating, air knife coating, and doctor knife coating. In particular, from the viewpoint of controlling the degree of crystallinity in the layer X, there is a good in-line coating technique in which the surface layer of a polyester film that has been uniaxially stretched in the machine direction is coated with a resin adopted as material to form the layer X, followed by forming the layer X while stretching the polyester film in the transverse direction at the same time. The layer X preferably has a thickness of 10 nm or more and 500 nm or less. When having a thickness of 10 nm or more, the layer X can develop a sufficient degree of water absorption to achieve a high removability. When having a thickness of 500 nm or less, generation of blocking and an associated decrease in handleability can be prevented. From the same point of view, it is more preferably 50 nm or more and 200 nm or less.

Described next is a method for forming a layer Y. The layer Y and the layer X may be formed simultaneously or separately. Simultaneous formation can be achieved by the formation of two layers by simultaneous coating using a die etc. or the use of a coating material that has been prepared by mixing a component for the layer X and a component for the layer Y. To ensure a high stacking accuracy between the layer X and the layer Y, it is preferable to form the layer X and the layer Y separately in the layer X and layer Y formation process. The laminated polyester film having a layer X prepared by a technique as described above is then coated with a coating liquid prepared by dissolving the component for the layer Y using generally known coating techniques such as gravure coating, Meyer bar coating, air knife coating, and doctor knife coating. The layer Y preferably has a thickness of 10 nm or more and 1,000 nm or less. When it is 10 nm or more, the layer Y can function sufficiently, whereas when it is 1,000 nm or less, the layer Y can develop a sufficient moisture permeability, making it easy to allow the value of $|HY(1)-HY(20)|$ to stay in the preferable range. From the same point of view, it is more preferably 50 nm or more and 500 nm or less.

Described next is a method for removing the layer X and the layer Y. Having properties as described above, the layer X is preferably removed by washing with water. For example, to remove the layer X and the layer Y, it is preferable that the laminated polyester film according to the present invention that contains the layer X and the layer Y be subjected to a step for unwinding the laminated polyester film, a step for supplying warm water to the surface of the unwound laminated polyester film to peel off the surface layers (layer X and layer Y) from the laminated polyester film, and a step for winding the peeled polyester film. The warm water preferably has a temperature of 50° C. or more and 120° C. or less. If it is 50° C. or more, the water will serve sufficiently for washing. If it is 120° C. or less, it serves to prevent the glass transition temperature of the polyester film from being exceeded to make the conveyance of the film impossible. It is preferable for the surface of the laminated polyester film to be in contact with water for 5 seconds or more, more preferably 10 seconds more, and still more preferably 30 seconds or more and 600 seconds or less. The step for supplying warm water to the surface of the unwound laminated polyester film can be carried out by using a water tank to immerse the whole laminated polyester film or by spraying compressed hot water onto the laminated polyester film. As water is supplied to the layer Y in the laminated polyester film, the water penetrates through the layer Y and will be absorbed by the layer X and the substrate while modifying the physical properties of the layer Y. As a result, the layer Y will be removed easily from the laminated polyester film, leading to a higher washing performance. In the steps described above, the laminated polyester film is conveyed at a speed of 5 m/min or more, preferably 10 m/min or more, and more preferably 20 m/min or more and 100 m/min or less. During the conveyance of the laminated polyester film provided with the layer X and the layer Y in the steps for removing the layer X and the layer Y, it is preferable to apply tension to the laminated polyester film. The application of tension works to expand the surface of the laminated polyester film to allow the layer X and the layer Y to be peeled off more smoothly, leading to a higher washing performance. The tension is preferably 5 N/m or more and 100 N/m or less, more preferably 20 N/m or more and 80 N/m or less, and still more preferably 30 N/m or more and 50 N/m or less. If the tension is 5 N/m or more, the surface of the laminated polyester film will be expanded sufficiently, leading to a higher washing performance. If the tension is 100 N/m or less, it serves to prevent the film from creasing that can reduce the expandability of the surface, leading to a higher washing performance.

Next, a preferred embodiment representing a method for recycling the film deprived of the layer X and the layer Y will be described below. To obtain recycled material from a film roll that has been deprived of the layer X and the layer Y by the method described above, a preferable way is to crush it after introducing it into a crusher with a rotary blade driven by a motor then introduce it into an extruder where it is melted, followed by extruding it into a strand and cutting it into pellets. To allow the recycled material to have an intrinsic viscosity in a preferable range, the temperature used for melting is preferably 250° C. or more and 300° C. or less. Here, the extruder to use may be either a single screw type one or a twin screw type one. After removing the layer X and the layer Y from the film, the film itself may include particles or contain residues left after removing the layer X and the layer Y, and accordingly, it is preferable to adopt a twin screw extruder in order to allow the components contained to be kneaded uniformly. Furthermore, when performing melt extrusion, it is also preferable to perform filtration through a filter in order to allow the contents of the components other than polyester to be in appropriate ranges. The resulting recycled material can be used as a material to form the layer A, layer B, and layer C.

In the resulting recycled material, it is preferable for the components other than polyester to account for 0.0001 mass % or more and 0.3 mass % or less. If the components other than polyester account for more than 0.3 mass %, depending on the production apparatus used, a large amount of foreign objects may be generated when a film is produced using the recycled material, thus making it difficult to achieve intended properties. For example, when the recycled material is applied to the formation of the layer A or the layer B on the laminated film according to the present invention, the layer A and the layer B may fail to have required surface properties. If an attempt is made to decrease impurities to allow the components other than polyester to account for as small as less than 0.0001 mass %, the step for removing the layer X and the layer Y can cause significant damage on the substrate film, possibly making it difficult to obtain a recycled polyester material.

The resulting recycled material may be used to form any of the layer A, layer B, or layer C, but it is particularly preferable to apply it to the layer C. The recycled material may contain, as a component other than polyester, particles existing in the laminated film, and therefore, if the recycled material is applied to the layer A or the layer B, it may have influence on the surface properties the layer A or the layer B. On the other hand, it is preferable to apply the recycled material to the layer C, which is an interlayer between the layer A and the layer B, because the layer C, which has no exposed surfaces, will not suffer deterioration in surface properties even when formed from the recycled material.

In another preferred embodiment of the laminated polyester film according to the present invention, as described above, a layer X is formed at least on either face of a polyester film and then a layer Y is formed to provide a process release film or other functional laminated film. After use, the layer X and layer Y are removed by washing with water to provide a high purity polyester film. Thus, the polyester film can be reused as obtained or the film may be remelted and processed into chips that can serve as a recycled material for film production to provide a film to be reused. From the viewpoint of film production property, the recycled material has an intrinsic viscosity (IV) of 0.5 or more and 0.7 or less, particularly preferably 0.55 or more and 0.65 or less.

[Methods for Evaluation of Characteristics]

A. Thickness of Each Layer

The thickness of each layer in a laminated film is determined by the method described below. A cross section of the film is prepared by cutting it with a microtome in the parallel direction to the width of the film. The cross section is observed by scanning electron microscopy at a magnification of 5,000 times to measure the thickness of each of the stacked layers.

B. Intrinsic Viscosity (IV)

A sample of the polyester film used for the present invention is dissolved in 100 ml of orthochlorophenol (solution concentration C=1.2 g/dl), and the viscosity of the solution at 25° C. is measured using an Ostwald viscometer. The viscosity of the solvent is also measured in the same way. From the resulting values of solution viscosity and solvent viscosity, the value of [η] (dl/g) is calculated by the equation (a) given below and the value obtained is adopted to represent the intrinsic viscosity (IV).

$$\eta sp/C=[\eta]+K[\eta]^2\cdot C \quad (a)$$

(Here, ηsp=(solution viscosity (dl/g)/solvent viscosity (dl/g))−1, and K is the Huggins constant (assumed to be 0.343).)

B-2. Quantity of Terminal Carboxyl Groups

The quantity of terminal carboxyl groups (quantity of terminal COOH groups) is determined by the method described in International Publication WO2010/103945.

C. Composition Analysis of Layer X

The layer X is examined to obtain the time-of-flight secondary ion mass spectrometry (TOF-SI MS) spectrum and Fourier transform infrared spectroscopy (FT-IR) spectrum, followed by determining the presence/absence of a polyvinyl alcohol skeleton etc.

[Measuring Conditions for TOF-SIMS]

For the surface of the layer X, the TOF-SIMS spectrum is observed using the equipment described below.

equipment: TOF.SIMS5 manufactured by ION-TOF
primary ion species: $Bi_3^{++}$
primary ion accelerating voltage: 25 kV
pulse width: 125 ns
punching: none (high spatial resolution measurement)
raster size: 40 μm×40 μm
number of scans: 64 scans
secondary ion polarity: positive
static neutralization: enabled
post-acceleration voltage: 9.5 kV

[Measuring Conditions for FT-IR]

For the surface of the layer X, the FT-IR spectrum is observed using the equipment described below.

equipment: Spectrum 100, manufactured by Perkin Elmer
light source: special ceramics
detector: DTGS
resolution: 4 $cm^{-1}$
number of times of calculation: 256 times
range of measuring wave number: 4,000 to 680 $cm^{-1}$
measuring mode: attenuated total reflection (ATR) technique
accessories: single reflection type ATR crystal (material: diamond/ZnSe)

C-2. Copolymer Content in Layer X (Mol %)

Using the equipment specified below, $^{13}$C-NMR spectrum and DEPT135 spectrum are observed and the copolymer content (mol %) is calculated from the peak area of a carbon signal attributed to the modifying group introduced.

equipment: ECZ-600R (manufactured by JEOL RESONANCE)
measuring method: Single $^{13}$C pulse with inverse gated 1H decoupling
measuring frequency: 150.9 MHz
pulse width: 5.25 μs
locking solvent: $D_2O$
reference for chemical shift: TSP (0 ppm)
number of times of calculation: 10,000 times
measuring temperature: 20° C.
specimen rotating speed: 15 Hz D. Degree of Saponification of Layer X According to the polyvinyl alcohol test method specified in JIS K 6726 (1994), the amount of the acetic acid group contained in a sample is determined and calculated based on titration with an aqueous sodium hydroxide solution.

E. Average Degree of Polymerization of Layer X

According to the polyvinyl alcohol test method specified in JIS K 6726 (1994), a sample is saponified completely with an aqueous sodium hydroxide solution and its viscosity at 25° C. is measured using an Ostwald viscosity system, followed by calculating the average degree of polymerization from the intrinsic viscosity.

F. Surface Free Energy of Layer X

Measurement is performed by the following procedure using a contact angle meter DM501, manufactured by Kyowa Interface Science Co., Ltd., and the attached analysis software FAMAS. The variance component, polar component, and hydrogen bond component of the surface free energy of the layer X are determined by measuring the static contact angle at 25° C. of glycerol, ethylene glycol, formamide, and diiodomethane, used as reference liquids, on the surface of the layer X and introducing the static contact angle of each liquid and the variance component, polarity component, and hydrogen bond component of the surface free energy of each liquid described in Non-patent document 1 into the extended Hawks equation proposed by Hata and Kitazaki in Non-patent document 2, followed by solving the simultaneous equations.

For the determination of the static contact angle, the sample is first allowed to stand in an environment at 25° C. for 12 hours, and a photograph is taken 30 seconds after the time (defined as 0 second) at which the droplet comes in contact with the surface of the sample, followed by calculating the static contact angle by the θ/2 method. Five measurements are taken at different positions, and the average value of the static contact angle measurements is used to calculate the variance component, polar component, and hydrogen bond component of the surface free energy of layer X.

G. Surface Free Energy of Layer Y

Except for using benzyl alcohol, ethylene glycol, formamide, and diiodomethane as reference liquids, measurements are taken by the same procedure as for the surface free energy of the layer X.

H. Water Contact Angle (°)

Measurement is performed by the following procedure using a contact angle meter DM501, manufactured by Kyowa Interface Science Co., Ltd., and the attached analysis software FAMAS. In an atmosphere at 23° C. and 65% RH, changes in the shape of a water droplet is videoed for 20 seconds, starting at the time (defined as 0 second) at which the droplet comes in contact with the surface of the sample. Five measurements are taken at different positions, and in the case where the surface of the sample that the water droplet comes in contact with is the layer X, the average value of the contact angle is determined from the shape of the water droplet observed after 1 second and the shape of the water droplet observed after 20 seconds and calculations are made from HX(1) and HX(20), whereas in the case where the surface of the sample that the water droplet comes in contact with is the layer Y, calculations are made from HY(1) and HY(20).

H-2.Degree of Crystallinity in Layer X

Observation is performed to measure a spectrum from the surface nearer to the layer X of the laminated polyester film by the FT-IR ATR method using the equipment and conditions described below. Then, a spectrum from polyester film Lumirror (registered trademark) #50T60, manufactured by Toray Co., Ltd., that is measured in the same way as above is subtracted to provide a difference spectrum. Then, using the smallest absorbance value between wavenumbers 1400 $cm^{-1}$ and 1550 $cm^{-1}$ as a baseline, the value of the absorbance maximum between wavenumbers 1400 $cm^{-1}$ and 1450 $cm^{-1}$ is identified as c, whereas using the straight line that connects the two absorbance minimums between wavenumbers 1100 $cm^{-1}$ and 1200 $cm^{-1}$ as a baseline, the value of the absorbance maximum between wavenumbers 1130 $cm^{-1}$ and 1150 $cm^{-1}$ is identified as d. The degree of crystallinity in the layer X is calculated by the equation “Percent crystallinity=92 (d/c)−18” proposed in Non-patent document (J. Polymer Science: Part A-1, Vol. 4, p. 679-698 (1966)). Here, in calculating c and d above, if there are two or more absorbance maximums in the aforementioned wavenumber range, the one at the higher absorbance is used to calculate c and d. Furthermore, if there are three or more absorbance minimums between wavenumbers 1100 $cm^{-1}$ and 1200 cm-1, the two lowest absorbances are used to draw a baseline. As for the surface of the layer X side of the laminated polyester film, the layer X may be the outermost surface, or the layer Y may be the outermost surface.

- equipment: 670-IR (FT-IR, manufactured by Varian)
- light source: globar
- detector: DLatgs (deuterated L-alanine doped trigylcine sulfate)
- resolution: 4 $cm^{-1}$
- number of times of calculation: 256 times
- measuring method: attenuated total reflection technique
- accessories: single reflection type ATR measuring accessory (The Seagull™)
- ATR crystal; germanium
- angle of incidence: 60°
- polarization: none
- equipment: 670-IR (FT-IR, manufactured by Varian)
- light source: globar
- detector: DLatgs (deuterated L-alanine doped trigylcine sulfate)
- resolution: 4 $cm^{-1}$
- number of times of calculation: 256 times
- measuring method: attenuated total reflection technique
- accessories: single reflection type ATR measuring accessory (The Seagull™)
- ATR crystal; germanium
- angle of incidence: 60°
- polarization: none I. Solvent Durability Ratio Measurement is performed by the following procedure using a Gakushin type testing machine (JIS L 0849 (2013)), manufactured by Daiei Kagaku Seiki Mfg. Co., Ltd.

[Abrasion Treatment with Cloth Soaked with Solvent]

The layer Y surface of the film is abraded using a testing machine and friction block as specified below.

- testing machine: Gakushin type testing machine (Type II rubbing tester specified in JIS L 0849 (2013))
- friction block: cotton cloth (#3 muslin) soaked with a toluene-ethanol mixed solvent (1:1 by mass)
- load: 1.0 kg
- number of times of rubbing motion: 30 times of to-and-fro motion

[Peeling Treatment]

A polyester adhesive tape (No. 31B, manufactured by Nitto Denko Corporation, width 19 mm) is adhered to the rubbed part of the layer Y surface while being pressed with a roller of 2.0 kg, and it is left to stand for 24 hours in an atmosphere at 23° C. and 65% RH. Then, using a peel testing machine VPA-H200, manufactured by Kyowa Interface Science Co., Ltd., the peel force between the sample surface and the polyester adhesive tape is measured under the conditions of a peeling angle of 180° and a peeling speed of 300 mm/min, followed by calculating F(B) assuming a width of 50 mm. The peel force F(A) for the unabraded surface of the layer Y is measured by the same procedure, and the solvent durability ratio is calculated by the equation given below.

$$\text{solvent durability ratio } (\%)=F(A)/F(B)\times 100$$

J. Peelability of Object to be Released

An object to be released is laid on a laminated polyester and a polyester adhesive tape (No. 31B, manufactured by Nitto Denko Corporation, width 19 mm) is adhered to the surface of the object to be released. Then, using a peel testing machine VPA-H200, manufactured by Kyowa Interface Science Co., Ltd., the peel force is measured under the conditions of a peeling angle of 180° and a peeling speed of 300 mm/min, followed by calculating the force assuming a width of 50 mm.

K. Solvent Resistance in Terms of Change in Haze

An object to be released is laid on a laminated polyester and then the object to be released is peeled off, followed by measuring the haze Hz(B) according to JIS K 7136 (2000) using a haze meter NDH-5000, manufactured by Nippon Denshoku Industries Co., Ltd. The haze Hz(A) of the laminated polyester is also measured by the same procedure before laying the object to be released, and ΔHz is calculated by the equation given below.

$$\Delta Hz=Hz(B)-Hz(A)$$

L. Solvent Resistance in Terms of Change in Surface Roughness

The surface roughness Sa(A) of a laminated polyester before laying an object to be released and the surface roughness Sa(B) of the laminated polyester after once laying an object to be released and then removing the object to be released are measured under the conditions given below using a noncontact surface profile measuring system VertScan (registered trademark) R550H-M100, manufactured by Ryoka Systems, Inc., followed by calculating ΔSa by the equation shown below. For the surface roughness, five measurements are taken and their arithmetic average is adopted.

$$\Delta Sa = Sa(B) - Sa(A)$$

(Measuring Conditions)
measuring mode: WAVE mode
objective lens: 50×
0.5× tube lens
measuring area: 187×139 μm M. Evaluation for Removability of Layer X and Layer Y For a polyester film prepared by removing the layer X and the layer Y, the water contact angle that develops after 1 second is measured according to the section H above and rated as shown below.

A; 65° or more and less than 80°
B; 80° or more and less than 90°, or less than 65°
C.; 90° or more and less than 95°
D, 95° or more and less than 98°
E; 98° or more N. Recyclability After being deprived of the layer X and the layer Y, a polyester film is crushed, dried at 180° C. for 2 hours, fed to an extruder, melt-extruded at 280° C., and molded into a sheet on a cast drum cooled at 25° C., and the resulting sheet is examined by the procedure described in the section B to determine the intrinsic viscosity. A smaller difference (ΔIV) between this intrinsic viscosity IV(R) and the intrinsic viscosity IV of the polyester film is more desirable.

O. RzjisB and RzjisX (nm)

The three dimensional surface roughness of a sample is measured using the equipment and measuring conditions given below. For the surface roughness, ten-point average roughness Rzjis is calculated using analysis software. Ten measurements are taken from different positions and their average is calculated to provide RzjisB and RzjisX (nm).

equipment: Surf-corder ET-4000A, manufactured by Kosaka Laboratory Ltd.
analysis software: i-Face model TDA31
stylus end radius: 0.2 μm
measuring field: X direction: 380 μm, interval: 1 μm
Y direction: 280 μm, interval: 5 μm
stylus pressure: 50 ρN
measuring speed: 0.1 mm/s
cut-off value: low range—0.8 mm, high range—none
leveling: whole range
filter: Gaussian filter (2D)
magnification: 100,000×

P. Content of Component Other than Polyester in Recycled Material (Mass %)

A predetermined quantity of a sample is dissolved in orthochlorophenol at 160° C. for 40 minutes and filtered through a glass filtration apparatus (3G3). After filtration, the residue is washed with dichloromethane, dried in hot air at 130° C. for 10 hours, and weighed, followed by calculating the proportion (mass %) of the mass of the residue relative to the sample before dissolution.

Q. Removability of Layer X and Layer Y after Moist Heat Treatment

The remainder of the laminated polyester film laid with the layer X that is prepared by the procedure described in each Example and is in the form of a roll is wrapped in a moisture resistant packing material (aluminum tube, manufactured by Nagaoka Sangyou Co., Ltd.) and stored in an atmosphere at 60° C. and 80% RH for 7 days. Subsequently, the laminated polyester film laid with the layer X is taken out, and the face of the layer X opposite to the face in contact with the polyester film is coated with the coating material A described later by the gravure coating method to form a layer Y with a thickness of 0.1 μm, thereby providing a laminated polyester film laid with a layer X and a layer Y. Then, the laminated polyester film laid with a layer X and a layer Y prepared in this way is adopted as a release film, and the face of the layer Y opposite to the face in contact with the layer X is coated with the dielectric paste described later to a thickness of 1.0 μm by the die coating method to form an object to be released. Subsequently, the dielectric layer is removed from the resulting layered body to provide a roll of process release film having no object to be released. The film roll is introduced into a rinsing apparatus equipped with an unwinding device and a winding device, in which the layer X and the layer Y are removed by rinsing with water at 60° C. for 2 minutes under a tension of 100 N/m. The polyester film deprived of the layer X and the layer Y is subjected to evaluation for the removability of the layer X and the layer Y as described in the section M.

EXAMPLES

The present invention will now be illustrated with reference to Examples, though the invention should not be construed as being limited thereto.

[Production of PET-1] Terephthalic acid and ethylene glycol were polymerized by a common method using antimony trioxide and magnesium acetate tetrahydrate as catalysts to prepare a melt-polymerized PET. The resulting melt-polymerized PET had a glass transition temperature of 81° C., a melting point of 255° C., an intrinsic viscosity of 0.65, and a terminal carboxyl group content of 20 eq/t.

[Production of MB-A] Eighty (80) parts by mass of PET-1 and 10 parts by mass of a 10 mass % water slurry of crosslinked polystyrene (styrene-acrylate copolymer) particles with a particle diameter of 0.1 μm (containing 1 part by mass of crosslinked polystyrene particles) were fed, and the vent hole was maintained at a reduced pressure of 1 kPa or less to remove moisture, thereby providing an MB containing 1 mass % crosslinked polystyrene particles. It had a glass transition temperature of 81° C., a melting point of 255° C., an intrinsic viscosity of 0.61, and a terminal carboxyl group content of 22 eq/t.

[Production of MB-B] Eighty (80) parts by mass of PET-1 and calcium carbonate particles with a diameter of 1.0 μm were fed, and the vent hole was maintained at a reduced pressure of 1 kPa or less to remove moisture, thereby providing an MB in which the particles accounted for 1 mass %. It had a glass transition temperature of 81° C., a melting point of 255° C., an intrinsic viscosity of 0.61, and a terminal carboxyl group content of 22 eq/t.

[Production of MB-C] PET-1 and silicate-alumina particles with a particle size of 4.0 μm were fed, and while maintaining the vent hole at a reduced pressure of 1 kPa or less to remove moisture, they were kneaded to provide MB-C in which the silicate-alumina particles accounted for 1.0 mass % of the whole MB-C. It had a glass transition temperature of 81° C., a melting point of 255° C., an intrinsic viscosity of 0.61, and a terminal carboxyl group content of 22 eq/t.

[Production of MB-D] PET-1 and a 10 mass % water slurry of crosslinked polystyrene (styrene-acrylate copolymer) particles with a diameter of 0.2 μm were fed in a vent type extruder, and while maintaining a reduced pressure of 1 kPa or less to remove moisture, they were kneaded to provide MB-D in which the crosslinked polystyrene particles accounted for 2 mass % of the whole MB-D. It had a glass transition temperature of 81° C., a melting point of 255° C., an intrinsic viscosity of 0.61, and a terminal carboxyl group content of 22 eq/t.

[Production of PEN] An ester interchange reaction of 2,6-dimethyl naphthalene dicarboxylate and ethylene glycol was performed using manganese acetate as catalyst. After the end of the ester interchange reaction, PEN was produced by a common method using antimony trioxide as catalyst. Furthermore, 6-crystal type alumina particles with a diameter of 0.1 μm were added during the polymerization process in such a manner that they accounted for 0.1%. The resulting PEN had a glass transition temperature of 124° C., a melting point of 265° C., an intrinsic viscosity of 0.62, and a terminal carboxyl group content of 25 eq/t.

[Preparation of coating material A] To prepare a coating material A, 100 parts by mass of an addition-reaction type silicone resin release agent (manufactured by Shin-Etsu Chemical Co., Ltd., trade name KS-847T) and 1 part by mass of a platinum catalyst (manufactured by Shin-Etsu Chemical Co., Ltd., trade name CAT-PL-50T) were mixed in toluene used as solvent in such a manner that the solid content was 1.5 mass %.

[Preparation of coating material B] To prepare a coating material B, 100 parts by mass of a condensation reaction type silicone resin release agent (manufactured by Dow Toray Co., Ltd., trade name SRX290) and 6 parts by mass of a curing agent (manufactured by Dow Toray Co., Ltd., trade name SRX242C) were mixed in toluene used as solvent in such a manner that the solid content was 1.5 mass %.

[Preparation of coating material C] To prepare a coating material C, 2 parts by mass of a UV curing type silicone resin release agent (manufactured by JNC Corporation, trade name FM-7721), 100 parts by mass of 1,9-nonanediol diacrylate (manufactured by Osaka Organic Chemical Industry Ltd., trade name Biscoat (registered trademark) #260), and 2 parts by mass of a photopolymerization initiator (manufactured by IGM RESINS, trade name OMNIRAD (registered trademark) 184) were mixed in toluene used as solvent in such a manner that the solid content was 1.5 mass %.

[Preparation of coating material D] According to the patent document Japanese Unexamined Patent Publication (Kokai) No. HEI-9-227627, PVA having a degree of saponification of 88, an average degree of polymerization of 500, and a degree of copolymerization with sodium sulfonate of 0.1 mol % was prepared. The PVA was dissolved in water so that it accounted for 4 mass % to provide a coating material D.

[Preparation of coating material E] According to the patent document Japanese Unexamined Patent Publication (Kokai) No. HEI-9-227627, PVA having a degree of saponification of 88, an average degree of polymerization of 500, and a degree of copolymerization with sodium sulfonate of 0.5 mol % was prepared. The PVA was dissolved in water so that it accounted for 4 mass % to provide a coating material E.

[Preparation of coating material F] According to the patent document Japanese Unexamined Patent Publication (Kokai) No. HEI-9-227627, PVA having a degree of saponification of 88, an average degree of polymerization of 500, and a degree of copolymerization with sodium sulfonate of 1 mol % was prepared. The PVA was dissolved in water so that it accounted for 4 mass % to provide a coating material F.

[Preparation of coating material G] According to the patent document Japanese Unexamined Patent Publication (Kokai) No. HEI-9-227627, PVA having a degree of saponification of 88, an average degree of polymerization of 400, and a degree of copolymerization with sodium sulfonate of 3 mol % was prepared. The PVA was dissolved in water so that it accounted for 4 mass % to provide a coating material G.

[Preparation of coating material H] According to the patent document Japanese Unexamined Patent Publication (Kokai) No. HEI-9-227627, PVA having a degree of saponification of 88, an average degree of polymerization of 300, and a degree of copolymerization with sodium sulfonate of 5 mol % was prepared. The PVA was dissolved in water so that it accounted for 4 mass % to provide a coating material H.

[Preparation of coating material I] According to the patent document Japanese Unexamined Patent Publication (Kokai) No. HEI-9-227627, PVA having a degree of saponification of 88, an average degree of polymerization of 1,000, and a degree of copolymerization with sodium sulfonate of 1 mol % was prepared. The PVA was dissolved in water so that it accounted for 4 mass % to provide a coating material I.

[Preparation of coating material J] According to the patent document Japanese Unexamined Patent Publication (Kokai) No. HEI-9-227627, PVA having a degree of saponification of 88, an average degree of polymerization of 300, and a degree of copolymerization with sodium sulfonate of 1 mol % was prepared. The PVA was dissolved in water in such a manner that it accounted for 4 mass % to provide a coating material J.

[Preparation of coating material K] Polyvinyl alcohol GL-05 (degree of saponification of 88, average degree of polymerization of 500), manufactured by Mitsubishi Chemical Corporation, was dissolved in water in such a manner that it accounted for 4 mass % to provide a coating material K.

[Preparation of coating material L] According to patent document Japanese Unexamined Patent Publication (Kokai) No. 2008-291120, PVA having a degree of saponification of 88, an average degree of polymerization of 1,000, and a degree of copolymerization with sodium carboxylate of 1 mol % was prepared. The PVA was dissolved in water in such a manner that it accounted for 4 mass % to provide a coating material L.

[Preparation of coating material M] According to patent document Japanese Unexamined Patent Publication (Kokai) No. 2004-285143, PVA having a degree of saponification of 88, an average degree of polymerization of 450, and a degree of copolymerization with 1.2-ethanediol of 6 mol % was prepared. The PVA was dissolved in water in such a manner that it accounted for 4 mass % to provide a coating material M.

[Preparation of coating material N] According to patent document Japanese Unexamined Patent Publication (Kokai) No. HEI-9-227627, PVA having a degree of saponification of 98, an average degree of polymerization of 500, and a degree of copolymerization with sodium sulfonate of 1 mol % was prepared. The PVA was dissolved in water in such a manner that it accounted for 4 mass % to provide a coating material N.

[Preparation of coating material O] According to patent document Japanese Unexamined Patent Publication (Kokai) No. HEI-9-227627, PVA having a degree of saponification of 88, an average degree of polymerization of 2,500, and a degree of copolymerization with sodium sulfonate of 1 mol % was prepared. The PVA was dissolved in water in such a manner that it accounted for 4 mass % to provide a coating material O.

[Preparation of dielectric paste] Glass beads with a number average particle diameter of 2 mm were added to a mixture of 100 parts by mass of barium titanate (manufactured by Fuji Titanium Industry Co. Ltd., trade name HPBT-1), 10 parts by mass of polyvinyl butyral (manufactured by Sekisui Chemical Co., Ltd., trade name BL-1), 5 parts by mass of dibutyl phthalate, and 60 parts by mass of toluene-ethanol (mass ratio 30:30), and they were mixed and dispersed in a jet mill for 20 hours and filtered to produce a paste-like dielectric paste.

[Preparation of adhesive agent Q] After feeding 97 parts by mass of butyl acrylate, 3 parts by mass of acrylic acid, 0.2 part by mass of azobisisobutyronitrile as polymerization initiator, and 233 parts by mass of ethyl acetate, nitrogen gas was supplied while stirring for about 1 hour to replace the atmosphere with nitrogen. Subsequently, the flask was heated at 60° C. and a reaction was continued for 7 hours to prepare an acrylic polymer with a weight average molecular weight (Mw) of 1,100,000. To this acrylic polymer solution (solid content 100 parts by mass), 0.8 part by mass of trimethylolpropane tolylene diisocyanate (trade name Coronate (registered trademark) L, manufactured by Nippon Polyurethane Industry Co., Ltd.), which is an isocyanate based crosslinking agent, and 0.1 part by mass of a silane coupling agent (trade name KBM-403, manufactured by Shin-Etsu Chemical Co., Ltd.) were added to prepare an adhesive agent composition (adhesive agent Q).

[Preparation of coating material R] According to patent document Japanese Unexamined Patent Publication (Kokai) No. HEI-9-227627, PVA having a degree of saponification of 88, an average degree of polymerization of 300, and a degree of copolymerization with 1.2-ethanediol of 10 mol % was prepared. The PVA was dissolved in water in such a manner that it accounted for 4 mass % to provide a coating material R.

[Preparation of coating material S] According to the patent document Japanese Unexamined Patent Publication (Kokai) No. HEI-9-227627, PVA having a degree of saponification of 88, an average degree of polymerization of 200, and a degree of copolymerization with sodium sulfonate of 3 mol % was prepared. The PVA was dissolved in water in such a manner that it accounted for 4 mass % to provide a coating material S.

[Preparation of coating material T] According to patent document Japanese Unexamined Patent Publication (Kokai) No. 2004-230772, an ethylene-propylene copolymer and an ethylene-hexene copolymer were synthesized separately, and 53 parts by mass of the ethylene-propylene copolymer, 42 parts by mass of the ethylene-hexene copolymer, and 1 part by mass of nonionic surface active agent (polyoxyethylene sorbitan monolaurate) Rheodor (registered trademark) TW-L120, manufactured by Kao Corporation, were mixed in toluene-ethyl acetate (mass ratio 85:15), which was used as solvent, in such a manner that the solid content was 1.5 mass %, thus providing a coating material T.

Example 1

As materials to form a layer A and a layer B, 80 parts by mass of PET-1 and 20 parts by mass of MB-A are mixed, vacuum-dried at 160° C. for 2 hours, fed to an extruder, melted at 280° C., and extruded through a die onto a casting drum having a surface temperature of 25° C. to prepare an unstretched sheet. Subsequently, the sheet was preheated by a group of heated rollers and stretched 3.8 times in the machine direction (MD) at a temperature of 90° C., and cooled by a group of rollers at a temperature of 25° C. to provide a uniaxially stretched film. On the resulting uniaxially stretched film, the coating material D was spread by the bar coating method in such a manner that the coat thickness would be 100 nm after drying, and then, with both ends of the film held by clips, it was introduced into a tenter having a heating zone maintained at 100° C. where it was stretched 4.3 times in the transverse direction (TD direction), that is, perpendicular to the machine direction. Following this, heat fixation was performed at a temperature of 230° C. for 10 seconds in the heat treatment zone in the tenter. Subsequently, it was cooled slowly and uniformly in the cooling zone and wound up to provide a laminated polyester film laid with a layer X.

For the resulting laminated polyester film, the face of the layer X opposite to the face in contact with the polyester film was then coated with the coating material A to form a layer Y by the gravure coating method in such a manner that the thickness would be 100 nm after drying, thereby providing a laminated polyester film.

The resulting laminated polyester film was then coated with a dielectric paste to form an object to be released by the die coating method in such a manner that the thickness would be 1.0 nm after drying. Starting 15 seconds after the end of coating, it was dried for 2 minutes in a furnace having a temperature of 100° C. and a wind speed of 5 m/sec. Subsequently, the dielectric body (object to be released) was removed from the resulting layered body to provide a film roll that was formed of the wound laminated polyester film deprived of the object to be released. The film roll was introduced into a rinsing apparatus equipped with an unwinding device and a winding device, in which it was rinsed with water at 100° C. for 2 minutes under a tension of 30 N/m to recover a polyester film deprived of the layer X and the layer Y.

Results of each evaluation are summarized in Tables.

Examples 2 to 7

A layer X was formed by using the coating material E in Example 2, the coating material F in Example 3, the coating material G in Example 4, the coating material H in Example 5, the coating material I in Example 6, and the coating material J in Example 7, and except for this, a laminated polyester film was prepared by the same procedure as in Example 1, followed by forming a object to be released thereon, peeling if off, and then removing the layer X and the layer Y to recycle the polyester film.

Examples 8 and 9

Except for forming a layer X having a thickness as specified in the appropriate table, the same procedure as in Example 3 was carried out to prepare a laminated polyester film, followed by forming an object to be released thereon, peeling if off, and then removing the layer X and the layer Y to recycle the polyester film.

Example 10

Except for using PEN as the polyester material, the same procedure as in Example 3 was carried out to prepare a laminated polyester film, followed by forming a object to be released thereon, peeling if off, and then removing the layer X and the layer Y to recycle the polyester film.

Examples 11 and 12

Except for forming a layer Y having a thickness as specified in the appropriate table, the same procedure as in Example 3 was carried out to prepare a laminated polyester film, followed by forming a object to be released thereon, peeling if off, and then removing the layer X and the layer Y to recycle the polyester film. Here, the layer Y had a thickness as specified in the appropriate table in making an evaluation for the removability of the layer X and the layer Y after moist heat treatment as described in the section Q.

Example 13

Except for using the coating material B to form the layer Y, the same procedure as in Example 3 was carried out to prepare a laminated polyester film, followed by forming an object to be released thereon, peeling if off, and then removing the layer X and the layer Y to recycle the polyester film. Here, the coating material B was used instead of the coating material A to form the layer Y in making an evaluation for the removability of the layer X and the layer Y after moist heat treatment as described in the section Q.

Example 14

Except for using the coating material C to form the layer Y and applying a total quantity of 200 mJ/cm$^2$ of UV light after the drying step in an atmosphere with an oxygen concentration of 0.1 vol %, the same procedure as in Example 3 was carried out to prepare a laminated polyester film, followed by forming an object to be released thereon, peeling if off, and then removing the layer X and the layer Y to recycle the polyester film. Here, the coating material C was used instead of the coating material A to form a layer Y and a total quantity of 200 mJ/cm$^2$ of UV light was applied after the drying step in an atmosphere with an oxygen concentration of 0.1 vol % for form a layer Y, followed by making an evaluation for the removability of the layer X and the layer Y after moist heat treatment as described in the section Q.

Examples 15 to 17

Except for forming the layer X by using the coating material K in Example 15, the coating material L in Example 16, and the coating material M in Example 17, a laminated polyester film was prepared by the same procedure as in Example 1, followed by forming an object to be released thereon, peeling if off, and then removing the layer X and the layer Y to recycle the polyester film.

Example 19

As materials to form a layer A and a layer B, 30 parts by mass of PET-1 and 20 parts by mass of MB-B were mixed, vacuum-dried at 160° C. for 2 hours, fed to an extruder, melted at 280° C., and extruded through a die onto a casting drum having a surface temperature of 25° C. to prepare an unstretched sheet. Subsequently, the sheet was preheated by a group of heated rollers and stretched 3.8 times in the machine direction (MD) at a temperature of 90° C., and cooled by a group of rollers at a temperature of 25° C. to provide a uniaxially stretched film. On the face A side of the resulting uniaxially stretched film, the coating material F was spread by the bar coating method in such a manner that the coat thickness would be 100 nm after drying and stretching, and then, with both ends of the film held by clips, it was introduced into a tenter having a heating zone maintained at 100° C. where it was stretched 4.3 times in the transverse direction (TD direction), that is, perpendicular to the machine direction. Following this, heat fixation was performed at a temperature of 230° C. for 10 seconds in the heat treatment zone in the tenter. Subsequently, it was cooled slowly and uniformly in the cooling zone and wound up into a roll to provide a laminated polyester film laid with a layer X. After sampling a part of the laminated polyester film laid with a layer X, the top face of the layer X (the face opposite to the face in contact with the polyester film) was coated with the coating material A by the gravure coating method to form a layer Y with a thickness of 0.1 μm, thereby providing a laminated polyester film laid with a layer X and a layer Y. Furthermore, the laminated polyester film laid with a layer X and a layer Y prepared in this way was adopted as a release film, and the face of the layer Y opposite to the face in contact with the layer X was coated with a dielectric paste by the die coating method to form an object to be released to have a thickness of 1.0 μm after drying. Subsequently, the dielectric layer was removed from the resulting layered body to provide a roll of process release film having no object to be released. The film roll was introduced into a rinsing apparatus equipped with an unwinding device and a winding device, in which the layer X and the layer Y were removed by rinsing with water at 60° C. for 2 minutes under a tension of 100 N/m.

Example 20

Except for forming a layer X having a thickness as specified in the appropriate table, the same procedure as in Example 19 was carried out to prepare a laminated polyester film laid with a layer X, a laminated polyester film laid with a layer X and a layer Y, and a release film. Properties of each film are given in the appropriate table.

A release film produced from a laminated film having a layer X that was not stored in a moist heat atmosphere and a release film produced from a laminated film having a layer X that was stored in a moist heat atmosphere were evaluated in terms of the removability of the layer X and the layer Y, and results showed that both of them were practically acceptable and sufficiently useful as release films.

Example 21

A material to form a face A was prepared by mixing 95 parts by mass of PET-1 and 5 parts by mass of MB-D and vacuum-drying the mixture at 160° C. for 2 hours, and a material to form a face B was prepared by mixing 50 parts by mass of PET-1 and 50 parts by mass of MB-B and vacuum-drying the mixture at 160° C. for 2 hours. They were fed to separate extruders, melted at 280° C., and combined in a merging device in such a manner that the thickness of the layer (layer A) to form the face A and the thickness of the layer (layer B) to form the face B had a ratio of 5/95, and then they were extruded through a die onto a casting drum with a surface temperature of 25° C. to prepare an unstretched sheet. Subsequently, the sheet was preheated by a group of heated rollers and stretched 3.8 times in the machine direction (MD) at a temperature of 90° C., and cooled by a group of rollers at a temperature of 25° C. to provide a uniaxially stretched film. On the face A side of the resulting uniaxially stretched film, the coating material F was spread by the bar coating method in such a manner that the coat thickness would be 100 nm after drying and stretching, and then, with both ends of the film held by clips, it was introduced into a tenter having a heating zone maintained at 100° C. where it was stretched 4.3 times in the transverse direction (TD direction), that is, perpendicular to the machine direction. Following this, heat fixation was performed at a temperature of 230° C. for 10 seconds in the heat treatment zone in the tenter. Subsequently, it was cooled slowly and uniformly in the cooling zone and wound up into a roll to provide a laminated polyester film laid with a layer X.

Subsequently, a part of the resulting laminated polyester film was used. For the laminated polyester film laid with a layer X, the face of the layer X opposite to the face in contact with the polyester film was coated with the coating material A by the gravure coating method to form a layer Y with a thickness of 0.1 μm to provide a laminated polyester film laid with a layer X and a layer Y.

A release film produced from a laminated film having a layer X that was not stored in a moist heat atmosphere and a release film produced from a laminated film having a layer X that was stored in a moist heat atmosphere were evaluated and results showed that they were high in the removability of the layer X and the layer Y and they were excellent release films.

Example 22

Except for forming a layer X having a thickness as specified in the appropriate table, as same procedure as in Example 21 was carried out to prepare a laminated polyester film laid with a layer X, a laminated polyester film laid with a layer X and a layer Y, and a release film. Properties of each film are given in the appropriate table.

A release film produced from a laminated film having a layer X that was not stored in a moist heat atmosphere and a release film produced from a laminated film having a layer X that was stored in a moist heat atmosphere were evaluated in terms of the removability of the layer X and the layer Y, and results showed that both of them were practically acceptable and sufficiently useful as release films.

Example 23

Except that a material to form a face A was prepared by mixing 95 parts by mass of PET-1 and 5 parts by mass of MB-D while a material to form a face B was prepared by mixing 10 parts by mass of PET-1 and 90 parts by mass of MB-C, the same procedure as in Example 22 was carried out to form a laminated polyester film laid with a layer X, a laminated polyester film laid with a layer X and a layer Y, and a release film. Properties of each film are given in the appropriate table.

A release film produced from a laminated film having a layer X that was not stored in a moist heat atmosphere and a release film produced from a laminated film having a layer X that was stored in a moist heat atmosphere were evaluated and results showed that they were high in the removability of the layer X and the layer Y and they were excellent release films.

Example 24

A procedure similar to Example 21 was carried out, but the adhesive agent Q was adopted to form an object to be released and spread by the die coating method in such a manner that the thickness would be 10 μm after drying. Subsequently, the adhesive agent Q was removed from the resulting layered body to provide a roll of process release film having no object to be released. The film roll was introduced into a rinsing apparatus equipped with an unwinding device and a winding device, in which the layer X and the layer Y were removed by rinsing with water at 60° C. for 2 minutes under a tension of 100 N/m.

A release film produced from a laminated film having a layer X that was not stored in a moist heat atmosphere and a release film produced from a laminated film having a layer X that was stored in a moist heat atmosphere were evaluated and results showed that they were high in the removability of the layer X and the layer Y and they were excellent release films.

Example 25

A material to form a face A was prepared by mixing 95 parts by mass of PET-1 and 5 parts by mass of MB-D and vacuum-drying the mixture at 160° C. for 2 hours, and a material to form a face B was prepared by mixing 50 parts by mass of PET-1 and 50 parts by mass of MB-B and vacuum-drying the mixture at 160° C. for 2 hours. In addition, a material to form an intermediate layer (layer C) to be disposed between the layer (layer A) forming the face A and the layer (layer B) forming the face B was prepared by vacuum-drying PET-1 at 160° C. for 2 hours. They were fed to separate extruders, melted at 280° C., and combined in a merging device in such a manner that they were stacked in the order of layer A/layer C/layer B with a thickness ratio of 5/90/5, and then they were extruded through a die onto a casting drum with a surface temperature of 25° C. to prepare an unstretched sheet. Subsequently, the sheet was preheated by a group of heated rollers and stretched 3.8 times in the machine direction (MD) at a temperature of 90° C., and cooled by a group of rollers at a temperature of 25° C. to provide a uniaxially stretched film. On the resulting uniaxially stretched film, the coating material F was spread by the bar coating method in such a manner that the coat thickness would be 100 nm after drying and stretching, and then, with both ends of the film held by clips, it was introduced into a tenter having a heating zone maintained at 100° C. where it was stretched 4.3 times in the transverse direction (TD direction), that is, perpendicular to the machine direction. Following this, heat fixation was performed at a temperature of 230° C. for 10 seconds in the heat treatment zone in the tenter. Subsequently, it was cooled slowly and uniformly in the cooling zone and wound up into a roll to provide a laminated polyester film laid with a layer X.

Subsequently, a part of the resulting laminated polyester film was used. For the laminated polyester film laid with a layer X, the face of the layer X opposite to the face in contact with the polyester film was coated with the coating material A by the gravure coating method to form a layer Y with a thickness of 0.1 μm to provide a laminated polyester film laid with a layer X and a layer Y.

Example 26

Except for forming a layer X using the coating material M, the same procedure as in Example 21 was carried out to prepare a laminated polyester film laid with a layer X, a laminated polyester film laid with a layer X and a layer Y, and a release film.

Reference Example 1

The polyester film deprived of the layer X and the layer Y prepared in Example 21 was cut and fed to a vent type extruder, and while maintaining a reduced pressure of 1 kPa or less to remove moisture, it was extruded at 280° C. and processed into pellets to provide a recycled material 1. The recycled material had a glass transition temperature of 81° C., a melting point of 255° C., an intrinsic viscosity of 0.58, and a terminal carboxyl group content of 28 eq/t. The components other than polyester contained in the recycled material accounted for 0.47 mass %.

Reference Example 2

The polyester film deprived of the layer X and the layer Y prepared in Example 25 was cut and fed to a vent type extruder, and while maintaining a reduced pressure of 1 kPa or less to remove moisture, it was extruded at 280° C. and processed into pellets to provide a recycled material 2. The recycled material had a glass transition temperature of 81° C., a melting point of 255° C., an intrinsic viscosity of 0.58, and a terminal carboxyl group content of 28 eq/t. The components other than polyester contained in the recycled material accounted for 0.03 mass %.

Example 27

A material to form a face A was prepared by mixing 95 parts by mass of PET-1 and 5 parts by mass of MB-D and vacuum-drying the mixture at 160° C. for 2 hours, and a material to form a face B was prepared by mixing 50 parts by mass of PET-1 and 50 parts by mass of MB-B and vacuum-drying the mixture at 160° C. for 2 hours. In addition, a material to form an intermediate layer (layer C) to be disposed between the layer (layer A) forming the face A and the layer (layer B) forming the face B was prepared by mixing 50 parts by mass of PET-1 and 50 parts by mass of the recycled material prepared in Reference example 1 and vacuum-drying the mixture at 160° C. for 2 hours. Then, the same procedure as in Example 25 was carried out to form a laminated polyester film laid with a layer X, a laminated polyester film laid with a layer X and a layer Y, and a release film.

Examples 28 to 30

Except for forming the layer X by using the coating material K in Example 28, the coating material G in Example 29, and the coating material L in Example 30, the same procedure as in Example 21 was carried out to prepare a laminated polyester film.

Example 31

A material to form a face A was prepared by mixing 85 parts by mass of PET-1, 5 parts by mass of MB-D, and 10 parts by mass of the recycled material 1 prepared in Reference example 1 and vacuum-drying the mixture at 160° C. for 2 hours, and a material to form a face B was prepared by mixing 50 parts by mass of PET-1 and 50 parts by mass of MB-B and vacuum-drying the mixture at 160° C. for 2 hours. In addition, a material to form an intermediate layer (layer C) to be disposed between the layer (layer A) forming the face A and the layer (layer B) forming the face B was prepared by vacuum-drying 100 parts by mass of PET-1 at 160° C. for 2 hours. Then, the same procedure as in Example 25 was carried out to form a laminated polyester film laid with a layer X, a laminated polyester film laid with a layer X and a layer Y, and a release film.

Example 32

A material to form a face A was prepared by mixing 85 parts by mass of PET-1, 5 parts by mass of MB-D, and 10 parts by mass of the recycled material 1 prepared in Reference example 1 and vacuum-drying the mixture at 160° C. for 2 hours, and a material to form a face B was prepared by mixing 10 parts by mass of PET-1, 40 parts by mass of MB-B, and 10 parts by mass of the recycled material 1 prepared in Reference example 1 and vacuum-drying the mixture at 160° C. for 2 hours. In addition, a material to form an intermediate layer (layer C) to be disposed between the layer (layer A) forming the face A and the layer (layer B) forming the face B was prepared by vacuum-drying 100 parts by mass of PET-1 at 160° C. for 2 hours. Then, the same procedure as in Example 25 was carried out to form a laminated polyester film laid with a layer X, a laminated polyester film laid with a layer X and a layer Y, and a release film.

Example 33

A material to form a face A was prepared by mixing 85 parts by mass of PET-1, 5 parts by mass of MB-D, and 10 parts by mass of the recycled material 1 prepared in Reference example 1 and vacuum-drying the mixture at 160° C. for 2 hours, and a material to form a face B was prepared by mixing 10 parts by mass of PET-1, 40 parts by mass of MB-B, and 10 parts by mass of the recycled material 1 prepared in Reference example 1 and vacuum-drying the mixture at 160° C. for 2 hours. In addition, a material to form an intermediate layer (layer C) to be disposed between the layer (layer A) forming the face A and the layer (layer B) forming the face B was prepared by vacuum-drying 50 parts by mass of PET-1 and 50 parts by mass of the recycled material 1 prepared in Reference example 1 at 160° C. for 2 hours. Then, the same procedure as in Example 25 was carried out to form a laminated polyester film laid with a layer X, a laminated polyester film laid with a layer X and a layer Y, and a release film.

Example 34

A material to form a face A was prepared by mixing 85 parts by mass of PET-1, 5 parts by mass of MB-D, and 10 parts by mass of the recycled material 1 prepared in Reference example 1 and vacuum-drying the mixture at 160° C. for 2 hours, and a material to form a face B was prepared by mixing 50 parts by mass of PET-1 and 50 parts by mass of MB-B and vacuum-drying the mixture at 160° C. for 2 hours. In addition, a material to form an intermediate layer (layer C) to be disposed between the layer (layer A) forming the face A and the layer (layer B) forming the face B was prepared by vacuum-drying 100 parts by mass of PET-1 at 160° C. for 2 hours. Then, the same procedure as in Example 25 was carried out to form a laminated polyester film laid with a layer X, a laminated polyester film laid with a layer X and a layer Y, and a release film.

Examples 35 and 36

Except that 95 parts by mass of PET-1 and 5 parts by mass of MB-D were used as materials to form a face A and a face B in Example 35 while 30 parts by mass of PET-1 and 70 parts by mass of MB-C were used as materials to form a face A and a face B in Example 36, the same procedure as in Example 19 was carried out to form a laminated polyester film laid with a layer X, a laminated polyester film laid with a layer X and a layer Y, and a release film.

Example 37

Except that a material to form a face A was prepared by mixing 50 parts by mass of PET-1 and 50 parts by mass of MB-B and vacuum-drying the mixture at 160° C. for 2 hours while a material to form a face B was prepared by mixing 95 parts by mass of PET-1 and 5 parts by mass of MB-D and vacuum-drying the mixture at 160° C. for 2 hours, the same procedure as in Example 21 was carried out to form a laminated polyester film laid with a layer X, a laminated polyester film laid with a layer X and a layer Y, and a release film.

Example 38

Either face (face A) of polyester film Lumirror (registered trademark) #50T60, manufactured by Toray Industries, Inc., was coated with the coating material F by the gravure coating method in such a manner that the coat thickness would be 100 nm after drying and the resulting film was wound up into a roll to provide a laminated polyester film laid with a layer X.

Subsequently, a part of the resulting laminated polyester film was used. For the laminated polyester film laid with a layer X, the face of the layer X opposite to the face in contact with the polyester film was coated with the coating material A by the gravure coating method to form a layer Y with a thickness of 0.1 μm to provide a laminated polyester film laid with a layer X and a layer Y. Here, the measurement of the intrinsic viscosity of the recycled film was omitted.

Example 39

Except for forming a layer X using the coating material R, the same procedure as in Example 21 was carried out to form a laminated polyester film laid with a layer X, a laminated polyester film laid with a layer X and a layer Y, and a release film.

Example 40

As materials to form a layer A and a layer B, 80 parts by mass of PET-1 and 20 parts by mass of MB-A were mixed, vacuum-dried at 160° C. for 2 hours, fed to an extruder, melted at 280° C., and extruded through a die onto a casting drum having a surface temperature of 25° C. to prepare an unstretched sheet. Subsequently, the sheet was preheated by a group of heated rollers and stretched 3.5 times in the machine direction (MD) at a temperature of 95° C., and cooled by a group of rollers at a temperature of 25° C. to provide a uniaxially stretched film. On the resulting uniaxially stretched film, the coating material S was spread by the bar coating method in such a manner that the coat thickness would be 100 nm after drying, and then, with both ends of the film held by clips, it was introduced into a tenter having a heating zone maintained at 95° C. where it was stretched 3.7 times in the transverse direction (TD direction), that is, perpendicular to the machine direction. Following this, heat fixation was performed at a temperature of 220° C. for 10 seconds in the heat treatment zone in the tenter. Subsequently, it was cooled slowly and uniformly in the cooling zone and wound up to provide a laminated polyester film laid with a layer X.

For the resulting laminated polyester film, the face of the layer X opposite to the face in contact with the polyester film was then coated with the coating material A to form a layer Y by the gravure coating method in such a manner that the thickness would be 100 nm after drying, thereby providing a laminated polyester film.

The resulting laminated polyester film was then coated with a dielectric paste to form an object to be released by the die coating method in such a manner that the thickness would be 1.0 μm after drying. Starting 15 seconds after the end of coating, it was dried for 2 minutes in a furnace having a temperature of 100° C. and a wind speed of 5 m/sec. Subsequently, the dielectric body (object to be released) was removed from the resulting layered body to provide a film roll that was formed of the wound laminated polyester film deprived of the object to be released. The film roll was introduced into a rinsing apparatus equipped with an unwinding device and a winding device, in which it was rinsed with water at 100° C. for 2 minutes under a tension of 30 N/m to recover a polyester film deprived of the layer X and the layer Y.

Example 41

Except for using a transverse stretching temperature as specified in the appropriate table, the same procedure as in Example 21 was carried out to prepare a laminated polyester film laid with a layer X, a laminated polyester film laid with a layer X and a layer Y, and a release film.

Example 42

A material to form a face A was prepared by mixing 95 parts by mass of PET-1 and 5 parts by mass of MB-D and vacuum-drying the mixture at 160° C. for 2 hours, and a material to form a face B was prepared by mixing 50 parts by mass of PET-1 and 50 parts by mass of MB-B and vacuum-drying the mixture at 160° C. for 2 hours. They were fed to separate extruders, melted at 280° C., and combined in a merging device in such a manner that the thickness of the layer (layer A) to form the face A and the thickness of the layer (layer B) to form the face B had a ratio of 5/95, and then they were extruded through a die onto a casting drum with a surface temperature of 25° C. to prepare an unstretched sheet. Subsequently, the sheet was preheated by a group of heated rollers and stretched 3.8 times in the machine direction (MD) at a temperature of 90° C., and cooled by a group of rollers at a temperature of 25° C. to provide a uniaxially stretched film. With both ends held by clips, the resulting uniaxially stretched film was introduced into a heating zone maintained at a temperature of 100° C. in a tenter and stretched 4.3 times in the transverse direction (TD direction), that is, perpendicular to the machine direction. Following this, heat fixation was performed at a temperature of 230° C. for 10 seconds in the heat treatment zone in the tenter. Subsequently, it was cooled slowly and uniformly in the cooling zone and wound up into a roll to provide a laminated polyester film that had no layer X.

Either face of a polyester film that had no layer X was coated with the coating material D by the gravure coating method to form a layer Y to have a thickness of 0.1 μm after drying, thereby providing a laminated polyester film laid with a layer Y.

The face of the layer Y opposite to the face in contact with the polyester film was coated with a dielectric paste by the die coating method to form an object to be released to have a thickness of 1.0 μm after drying. Subsequently, the dielectric layer was removed from the resulting layered body to provide a roll of process release film having no object to be released. The film roll was introduced into a rinsing apparatus equipped with an unwinding device and a winding device, in which the layer Y was removed by rinsing with water at 60° C. for 2 minutes under a tension of 100 N/m. Here, the coating material D was used instead of the coating material A to form the layer Y in making an evaluation for the removability of the layer X and the layer Y after moist heat treatment as described in the section Q.

Comparative Examples 1 to 2

Except for forming the face A and the face B using PET-1 as material while forming a layer X using the coating material N in Comparative example 1 and using the coating material O in Comparative example 2, the same procedure as in Example 1 was carried out to prepare a laminated polyester film, followed by forming an object to be released thereon, peeling if off, and then removing the layer X and the layer Y to recycle the polyester film.

In Comparative example 1 where the PVA component used to form the layer X had a relatively high degree of saponification, the polarity component $\gamma X_P$ and the hydrogen bond component $\gamma X_H$ of the surface free energy of the layer X were not in the preferable range, and accordingly, the film was inferior in terms of the removability of the layer X and the layer Y. Subsequently, as described in the section N above, the polyester film was crushed and melt-extruded, but since the layer X and the layer Y were left unremoved, the material was degraded in the extruder and it was impossible to form a sheet.

In Comparative example 2 where the PVA component used to form the layer X had a high average degree of polymerization, the polarity component $\gamma X_P$ and the hydrogen bond component $\gamma X_H$ of the surface free energy of the layer X were not in the preferable range, and accordingly, the film was inferior in terms of the removability of the layer X and the layer Y. Subsequently, as described in the section N above, the polyester film was crushed and melt-extruded, but since the layer X and the layer Y were left unremoved, the material was degraded in the extruder and it was impossible to form a sheet.

Comparative Example 3

Except for forming a layer Y using the coating material A, the same procedure as in Example 42 was carried out to prepare a laminated polyester film, followed by spreading a ceramic green sheet and an adhesive sheet as objects to be released. After making an evaluation, the ceramic green sheet was peeled off and the layer Y was removed to recycle the polyester film.

The film had no layer X and the value of |HY(1)−HY(20)| (°) of the layer Y was not in the preferable range, resulting in a poor layer Y removability. Subsequently, as described in the section N above, the polyester film was crushed and melt-extruded, but since and the layer Y was left unremoved, the material was degraded in the extruder and it was impossible to form a sheet.

TABLE 1

| | | | | Example 1 | Example 2 | Example 3 | Example 4 | Example 5 | Example 6 |
|---|---|---|---|---|---|---|---|---|---|
| polyester film | layer A | component material | | PET-1 MB-A | PET-1 MB-A | PET-1 MB-A | PET-1 MB-A | PET-1 MB-A | PET-1 MB-A |
| | layer B | component material | | PET-1 MB-A | PET-1 MB-A | PET-1 MB-A | PET-1 MB-A | PET-1 MB-A | PET-1 MB-A |
| | | RzjisB (nm) | | 235 | 235 | 235 | 235 | 235 | 235 |
| | IV | | | 0.64 | 0.64 | 0.64 | 0.64 | 0.64 | 0.64 |
| | production conditions | ratio in MD | temperature (° C.) | 90 | 90 | 90 | 90 | 90 | 90 |
| | | | ratio | 3.8 | 3.8 | 3.8 | 3.8 | 3.8 | 3.8 |
| | | ratio in TD | temperature (° C.) | 100 | 100 | 100 | 100 | 100 | 100 |
| | | | ratio | 4.3 | 4.3 | 4.3 | 4.3 | 4.3 | 4.3 |
| | | heat treatment temperature (° C.) | | 230 | 230 | 230 | 230 | 230 | 230 |
| | thickness (nm) | | | 30 | 30 | 30 | 30 | 30 | 30 |

| | | | | Example 7 | Example 8 | Example 9 | Example 10 |
|---|---|---|---|---|---|---|---|
| polyester film | layer A | component material | | PET-1 MB-A | PET-1 MB-A | PET-1 MB-A | PEN MB-A |
| | layer B | component material | | PET-1 MB-A | PET-1 MB-A | PET-1 MB-A | PEN MB-A |
| | | RzjisB (nm) | | 235 | 235 | 235 | 214 |
| | IV | | | 0.64 | 0.64 | 0.64 | 0.61 |
| | production conditions | ratio in MD | temperature (° C.) | 90 | 90 | 90 | 120 |

TABLE 1-continued

| | | | Example 1 | Example 2 | Example 3 | Example 4 | Example 5 | Example 6 |
|---|---|---|---|---|---|---|---|---|
| | | ratio | | | 3.8 | 3.8 | 3.8 | 3.8 |
| | ratio in TD | temperature (° C.) | | | 100 | 100 | 100 | 150 |
| | | ratio | | | 4.3 | 4.3 | 4.3 | 3.8 |
| | heat treatment temperature (° C.) | | | | 230 | 230 | 230 | 230 |
| thickness (nm) | | | | | 30 | 30 | 30 | 30 |

TABLE 2

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| layer X | existence of PVA skeleton | | ○ | ○ | ○ | ○ | ○ | ○ | ○ | ○ | ○ | ○ |
| | existence of sulfonate modified PVA skeleton | | ○ | ○ | ○ | ○ | ○ | ○ | ○ | ○ | ○ | ○ |
| | modification group | | sodium sulfonate | sodium sulfonate | sodium sulfonate | sodium sulfonate | sodium sulfonate | sodium sulfonate | sodium sulfonate | sodium sulfonate | sodium sulfonate | sodium sulfonate |
| | degree of copolymerization (mol %) | | 0.1 | 0.5 | 1 | 3 | 5 | 1 | 1 | 1 | 1 | 1 |
| | degree of saponification | | 88 | 88 | 88 | 88 | 88 | 88 | 88 | 88 | 88 | 88 |
| | average degree of polymerization | | 500 | 500 | 500 | 400 | 300 | 1000 | 300 | 500 | 500 | 500 |
| | thickness (xa) (nm) | | 100 | 100 | 100 | 100 | 100 | 100 | 100 | 1000 | 50 | 100 |
| | RzjisX (nm) | | 98 | 98 | 98 | 98 | 98 | 98 | 98 | 98 | 98 | 95 |
| | RzjisX/xa | | 1.0 | 1.0 | 1.0 | 1.0 | 1.0 | 1.0 | 1.0 | 0.1 | 2.0 | 1.0 |
| | surface free energy (mN/m) | total | 51.2 | 51.6 | 55.5 | 58.8 | 59.2 | 54.0 | 57.2 | 55.5 | 55.5 | 55.5 |
| | | variance component | 24 | 23 | 24 | 23 | 22 | 24 | 23 | 24 | 24 | 24 |
| | | polarity component $\gamma X_P$ | 21 | 22 | 24 | 28 | 29 | 20 | 28 | 24 | 24 | 24 |
| | | hydrogen bond component $\gamma X_H$ | 6.2 | 6.6 | 7.5 | 7.8 | 8.2 | 10 | 6.2 | 7.5 | 7.5 | 7.5 |
| | water contact angle HX(1) (°) | | 41 | 41 | 39 | 32 | 24 | 54 | 33 | 39 | 39 | 39 |
| | water contact angle HX(20) (°) | | 25 | 20 | 19 | 14 | 9 | 48 | 7 | 22 | 16 | 20 |
| | \|HX(1)-HX(20)\| | | 16 | 21 | 20 | 18 | 15 | 6 | 26 | 17 | 23 | 19 |
| | degree of crystallinity | | 35 | 34 | 33 | 20 | 14 | 38 | 32 | 33 | 33 | 33 |
| RzjisB/xa | | | 2.4 | 2.4 | 2.4 | 2.4 | 2.4 | 2.4 | 2.4 | 0.2 | 4.7 | 2.1 |

TABLE 3

| | | | Example 1 | Example 2 | Example 3 | Example 4 | Example 5 | Example 6 |
|---|---|---|---|---|---|---|---|---|
| layer Y | primary component | | addition reaction type silicone | addition reaction type silicone | addition reaction type silicone | addition reaction type silicone | addition reaction type silicone | addition reaction type silicone |
| | thickness (nm) | | 100 | 100 | 100 | 100 | 100 | 100 |
| | surface free energy (mN/m) | variance component | 11 | 10 | 10 | 10 | 10 | 10 |
| | | polarity component $\gamma Y_P$ | 0.2 | 0.3 | 0.4 | 1.2 | 1.8 | 0.3 |
| | | hydrogen bond component $\gamma Y_H$ | 1.5 | 1.6 | 1.8 | 1.7 | 1.7 | 2.4 |

TABLE 3-continued

| | | | | | | | | |
|---|---|---|---|---|---|---|---|---|
| | water contact angle HY(1) (°) | | 109 | 109 | 109 | 109 | 109 | 109 |
| | water contact angle HY(20) (°) | | 95 | 95 | 95 | 97 | 99 | 99 |
| | \|HY(1)-HY(20)\| (°) | | 14 | 14 | 14 | 12 | 10 | 10 |
| | F(A) (mN/50 mm) | | 90 | 90 | 90 | 90 | 90 | 90 |
| | F(B) (mN/50 mm) | | 820 | 690 | 560 | 560 | 500 | 450 |
| | solvent durability ratio (%) | | 11 | 13 | 16 | 16 | 18 | 20 |
| release film | object to be released | | barium titanate | barium titanate | barium titanate | barium titanate | barium titanate | barium titanate |
| | peelability of object to be released | peeling force (mN/ 50 mm) | 45 | 40 | 40 | 40 | 40 | 40 |
| | solvent resistance in terms of haze change | Hz (A) (%) | 6 | 6 | 6 | 6 | 6 | 6 |
| | | Hz (B) (%) | 7 | 6 | 6 | 6 | 6 | 6 |
| | | ΔHz (%) | 1 | 0 | 0 | 0 | 0 | 0 |
| | solvent resistance in terms of change in surface roughness | surface roughness Sa (A) (nm) | 5 | 5 | 5 | 5 | 5 | 5 |
| | | surface roughness Sa (B) (nm) | 6 | 5 | 5 | 5 | 5 | 5 |
| | | ΔSa (nm) | 1 | 0 | 0 | 0 | 0 | 0 |
| | removability of layers X and Y | method for removal | rinsing | rinsing | rinsing | rinsing | rinsing | rinsing |
| | | water contact angle after removal (°) | 80 | 82 | 70 | 75 | 82 | 85 |
| | recyclabililty | method for recycling | melt-extrusion | melt-extrusion | melt-extrusion | melt-extrusion | melt-extrusion | melt-extrusion |
| | | IV(R) | 0.52 | 0.50 | 0.60 | 0.60 | 0.50 | 0.48 |
| | removability of layers X and Y after moist heat treatment | method for removal | rinsing | rinsing | rinsing | rinsing | rinsing | rinsing |
| | | water contact angle after removal (°) | 91 | 93 | 81 | 86 | 93 | 93 |

| | | | | Example 7 | Example 8 | Example 9 | Example 10 |
|---|---|---|---|---|---|---|---|
| | layer Y | primary component | | addition reaction type silicone | addition reaction type silicone | addition reaction type silicone | addition reaction type silicone |
| | | thickness (nm) | | 100 | 100 | 100 | 100 |
| | | surface free energy (mN/m) | variance component | 10 | 11 | 10 | 10 |
| | | | polarity component $\gamma Y_P$ | 0.4 | 0.6 | 0.3 | 0.4 |
| | | | hydrogen bond component $\gamma Y_H$ | 1.8 | 2.0 | 1.7 | 1.8 |
| | | water contact angle HY(1) (°) | | 109 | 109 | 109 | 109 |
| | | water contact angle HY(20) (°) | | 90 | 95 | 95 | 95 |
| | | \|HY(1)-HY(20)\| (°) | | 19 | 14 | 14 | 14 |
| | | F(A) (mN/50 mm) | | 90 | 90 | 90 | 90 |
| | | F(B) (mN/50 mm) | | 900 | 600 | 640 | 560 |
| | | solvent durability ratio (%) | | 10 | 15 | 14 | 16 |
| | release film | object to be released | | barium titanate | barium titanate | barium titanate | barium titanate |
| | | peelability of object to be released | peeling force (mN/ 50 mm) | 45 | 40 | 40 | 40 |
| | | solvent resistance in terms of haze change | Hz (A) (%) | 6 | 6 | 6 | 4 |
| | | | Hz (B) (%) | 7 | 6 | 6 | 4 |
| | | | ΔHz (%) | 1 | 0 | 0 | 0 |

TABLE 3-continued

| | | | | | |
|---|---|---|---|---|---|
| solvent resistance in terms of change in surface roughness | surface roughness Sa (A) (nm) | 5 | 4 | 6 | 4 |
| | surface roughness Sa (B) (nm) | 6 | 4 | 6 | 4 |
| | ΔSa (nm) | 1 | 0 | 0 | 0 |
| removability of layers X and Y | method for removal | rinsing | rinsing | rinsing | rinsing |
| | water contact angle after removal (°) | 80 | 85 | 66 | 70 |
| recyclabililty | method for recycling | melt-extrusion | melt-extrusion | melt-extrusion | melt-extrusion |
| | IV(R) | 0.52 | 0.50 | 0.60 | 0.60 |
| removability of layers X and Y after moist heat treatment | method for removal | rinsing | rinsing | rinsing | rinsing |
| | water contact angle after removal (°) | 91 | 93 | 77 | 81 |

TABLE 4

| | | | | Example 11 | Example 12 | Example 13 | Example 14 | Example 15 | Example 16 | Example 17 | Comparative example 1 | Comparative example 2 |
|---|---|---|---|---|---|---|---|---|---|---|---|---|
| polyester film | layer A | component material | | PET-1 MB-A | PET-1 MB-A | PET-1 MB-A | PET-1 MB-A | PET-1 MB-A | PET-1 MB-A | PET-1 MB-A | PET-1 | PET-1 |
| | layer B | component material | | PET-1 MB-A | PET-1 MB-A | PET-1 MB-A | PET-1 MB-A | PET-1 MB-A | PET-1 MB-A | PET-1 MB-A | PET-1 | PET-1 |
| | | RzjisB (nm) | | 235 | 235 | 235 | 235 | 235 | 235 | 235 | 10 | 10 |
| | IV | | | 0.64 | 0.64 | 0.64 | 0.64 | 0.64 | 0.64 | 0.64 | 0.65 | 0.65 |
| | production conditions | ratio in MD | temperature (° C.) | 90 | 90 | 90 | 90 | 90 | 90 | 90 | 90 | 90 |
| | | | ratio | 3.8 | 3.8 | 3.8 | 3.8 | 3.8 | 3.8 | 3.8 | 3.8 | 3.8 |
| | | ratio in TD | temperature (° C.) | 100 | 100 | 100 | 100 | 100 | 100 | 100 | 100 | 100 |
| | | | ratio | 4.3 | 4.3 | 4.3 | 4.3 | 4.3 | 4.3 | 4.3 | 4.3 | 4.3 |
| | | heat treatment temperature (° C.) | | 230 | 230 | 230 | 230 | 230 | 230 | 230 | 235 | 235 |
| | thickness (nm) | | | 30 | 30 | 30 | 30 | 30 | 30 | 30 | 30 | 30 |

TABLE 5

| | | | Example 11 | Example 12 | Example 13 | Example 14 | Example 15 | Example 16 | Example 17 | Comparative example 1 | Comparative example 2 |
|---|---|---|---|---|---|---|---|---|---|---|---|
| layer X | existence of PVA skeleton | | ○ | ○ | ○ | ○ | ○ | ○ | ○ | ○ | ○ |
| | existence of sulfonate modified PVA skeleton | | ○ | ○ | ○ | ○ | x | x | x | ○ | ○ |
| | modification group | | sodium sulfonate | sodium sulfonate | sodium sulfonate | sodium sulfonate | — | carboxylic acid sodium | 1,2-ethane diols | sodium sulfonate | sodium sulfonate |
| | degree of copolymerization (mol %) | | 1 | 1 | 1 | 1 | — | 1 | 6 | 1 | 1 |
| | degree of saponification | | 88 | 88 | 88 | 88 | 88 | 88 | 88 | 98 | 88 |
| | average degree of polymerization | | 500 | 500 | 500 | 500 | 500 | 1000 | 450 | 500 | 2500 |
| | thickness (xa) (nm) | | 100 | 100 | 100 | 100 | 100 | 100 | 100 | 100 | 100 |
| | RzjisX (nm) | | 98 | 98 | 98 | 98 | 98 | 98 | 98 | 10 | 10 |
| | RzjisX/xa | | 1.0 | 1.0 | 1.0 | 1.0 | 1.0 | 1.0 | 1.0 | 0.1 | 0.1 |
| | surface free | total | 55.5 | 55.5 | 55.5 | 55.5 | 56.8 | 58.8 | 60.3 | 57.0 | 43.0 |

TABLE 5-continued

| | | | Example 11 | Example 12 | Example 13 | Example 14 | Example 15 | Example 16 | Example 17 | Comparative example 1 | Comparative example 2 |
|---|---|---|---|---|---|---|---|---|---|---|---|
| | energy (mN/m) | variance component | 24 | 24 | 24 | 24 | 25 | 23 | 25 | 23 | 24 |
| | | polarity component $\gamma X_P$ | 24 | 24 | 24 | 24 | 26 | 32 | 31 | 19 | 5 |
| | | hydrogen bond component $\gamma X_H$ | 7.5 | 7.5 | 7.5 | 7.5 | 5.8 | 3.8 | 4.3 | 15 | 14 |
| | water contact angle HX(1) (°) | | 39 | 39 | 39 | 39 | 47 | 40 | 49 | 23 | 62 |
| | water contact angle HX(20) (°) | | 19 | 19 | 19 | 19 | 33 | 14 | 17 | 12 | 59 |
| | $\lvert HX(1)-HX(20)\rvert$ | | 20 | 20 | 20 | 20 | 14 | 26 | 32 | 11 | 3 |
| | degree of crystallinity | | 33 | 33 | 33 | 33 | 35 | 38 | 3 | 38 | 42 |
| RzjisB/xa | | | 2.4 | 2.4 | 2.4 | 2.4 | 2.4 | 2.4 | 2.4 | 0.1 | 0.1 |

TABLE 6

| | | | Example 11 | Example 12 | Example 13 | Example 14 | Example 15 | Example 16 | Example 17 | Comparative example 1 | Comparative example 2 |
|---|---|---|---|---|---|---|---|---|---|---|---|
| layer Y | primary component | | addition reaction type silicone | addition reaction type silicone | condensation reaction type silicone | UV cured type silicone | addition reaction type silicone | addition reaction type silicone | addition reaction type silicone | addition reaction type silicone | addition reaction type silicone |
| | thickness (nm) | | 10 | 1000 | 100 | 100 | 100 | 100 | 100 | 100 | 100 |
| | surface free energy (mN/m) | variance component | 11 | 9 | 10 | 10 | 11 | 11 | 11 | 10 | 9 |
| | | polarity component $\gamma Y_P$ | 1.2 | 0.2 | 0.5 | 0.5 | 0.2 | 0.6 | 0.6 | 0.2 | 0.1 |
| | | hydrogen bond component $\gamma Y_H$ | 3.6 | 1.5 | 2.0 | 1.8 | 1.3 | 0.9 | 1.0 | 2.5 | 2.5 |
| | water contact angle HY(1) (°) | | 109 | 109 | 100 | 104 | 103 | 103 | 103 | 109 | 109 |
| | water contact angle HY(20) (°) | | 90 | 104 | 90 | 91 | 31 | 90 | 26 | 106 | 105 |
| | $\lvert HY(1)-HY(20)\rvert$ (°) | | 19 | 5 | 10 | 13 | 72 | 13 | 77 | 3 | 4 |
| | F(A) (mN/50 mm) | | 90 | 90 | 150 | 110 | 85 | 90 | 90 | 90 | 90 |
| | F(B) (mN/50 mm) | | 750 | 560 | 830 | 740 | 8500 | 11000 | 13000 | 300 | 410 |
| | solvent durability ratio (%) | | 12 | 16 | 18 | 15 | 1.0 | 0.8 | 0.7 | 30 | 22 |
| release film | object to be released | | barium titanate | barium titanate | barium titanate | barium titanate | barium titanate | barium titanate | barium titanate | barium titanate | barium titanate |
| | peelability of object to be released | peeling force (mN/50 mm) | 40 | 40 | 65 | 45 | 100 | 100 | 95 | 40 | 40 |
| | solvent resistance in terms of haze change | Hz (A) (%) | 6 | 6 | 6 | 6 | 6 | 6 | 6 | 6 | 6 |
| | | Hz (B) (%) | 6 | 6 | 6 | 6 | 18 | 20 | 21 | 6 | 6 |
| | | ΔHz (%) | 0 | 0 | 0 | 0 | 12 | 14 | 15 | 0 | 0 |
| | solvent resistance in terms of surface roughness | surface roughness Sa (A) (nm) | 6 | 4 | 5 | 5 | 5 | 5 | 5 | 5 | 5 |
| | | surface roughness Sa (B) (nm) | 6 | 4 | 5 | 5 | 13 | 15 | 15 | 5 | 5 |
| | | ΔSa (nm) | 0 | 0 | 0 | 0 | 8 | 10 | 10 | 0 | 0 |
| | removal of layers X and Y | method for removal | rinsing | rinsing | rinsing | rinsing | rinsing | rinsing | rinsing | rinsing | rinsing |
| | | water contact angle after removal (°) | 65 | 78 | 72 | 70 | 79 | 75 | 76 | 95 | 95 |
| | recycling | method for recycling | melt-extrusion | melt-extrusion | melt-extrusion | melt-extrusion | melt-extrusion | melt-extrusion | melt-extrusion | melt-extrusion | melt-extrusion |
| | | IV(R) | 0.60 | 0.60 | 0.60 | 0.60 | 0.60 | 0.60 | 0.60 | — | — |
| | removability of layers X and Y after moist heat treatment | method for removal | rinsing | rinsing | rinsing | rinsing | rinsing | rinsing | rinsing | rinsing | rinsing |
| | | water contact angle after removal (°) | 76 | 90 | 83 | 81 | 90 | 86 | 87 | 98 | 98 |

TABLE 7

| | | | | Example 19 | Example 20 | Example 21 | Example 22 | Example 23 | Example 24 | Example 25 | Example 26 | Example 27 | Example 28 |
|---|---|---|---|---|---|---|---|---|---|---|---|---|---|
| polyester film | layer A | component | | PET-1 | PET-1 | PET-1 | PET-1 | PET-1 | PET-1 | PET-1 | PET-1 | PET-1 | PET-1 |
| | | material | | MB-B | MB-B | MB-D | MB-D | MB-D | MB-D | MB-D | MB-D | MB-D | MB-D |
| | layer B | component | | PET-1 | PET-1 | PET-1 | PET-1 | PET-1 | PET-1 | PET-1 | PET-1 | PET-1 | PET-1 |
| | | material | | MB-B | MB-B | MB-B | MB-B | MB-C | MB-B | MB-B | MB-B | MB-B | MB-B |
| | | RzjisB (nm) | | 951 | 951 | 813 | 821 | 2322 | 813 | 823 | 809 | 810 | 813 |
| | IV | | | 0.63 | 0.63 | 0.63 | 0.63 | 0.62 | 0.63 | 0.63 | 0.63 | 0.63 | 0.63 |
| | production conditions | ratio in MD | temperature (° C.) | 90 | 90 | 90 | 90 | 90 | 90 | 90 | 90 | 90 | 90 |
| | | | ratio | 3.8 | 3.8 | 3.8 | 3.8 | 3.8 | 3.8 | 3.8 | 3.8 | 3.8 | 3.8 |
| | | ratio in TD | temperature (° C.) | 100 | 100 | 100 | 100 | 100 | 100 | 100 | 100 | 100 | 100 |
| | | | ratio | 4.3 | 4.3 | 4.3 | 4.3 | 4.3 | 4.3 | 4.3 | 4.3 | 4.3 | 4.3 |
| | | heat treatment temperature (° C.) | | 235 | 235 | 235 | 235 | 235 | 235 | 235 | 235 | 235 | 235 |
| | thickness (nm) | | | 30 | 30 | 30 | 30 | 30 | 30 | 30 | 30 | 30 | 30 |

TABLE 8

| | | | Example 19 | Example 20 | Example 21 | Example 22 | Example 23 | Example 24 | Example 25 | Example 26 | Example 27 | Example 28 |
|---|---|---|---|---|---|---|---|---|---|---|---|---|
| layer X | existence of PVA skeleton | | ○ | ○ | ○ | ○ | ○ | ○ | ○ | ○ | ○ | ○ |
| | existence of sulfonate modified PVA skeleton | | ○ | ○ | ○ | ○ | ○ | ○ | ○ | x | ○ | x |
| | modification group | | sodium sulfonate | sodium sulfonate | sodium sulfonate | sodium sulfonate | sodium sulfonate | sodium sulfonate | sodium sulfonate | 1,2-ethane diols | sodium sulfonate | — |
| | degree of copoly-merization (mol %) | | 1 | 1 | 1 | 1 | 1 | 1 | 1 | 6 | 1 | — |
| | degree of saponification | | 88 | 88 | 88 | 88 | 88 | 88 | 88 | 88 | 88 | 88 |
| | average degree of polymerization | | 500 | 500 | 500 | 500 | 500 | 500 | 500 | 500 | 500 | 500 |
| | thickness (xa) (nm) | | 100 | 300 | 100 | 500 | 500 | 100 | 100 | 100 | 100 | 100 |
| | RzjisX (nm) | | 903 | 846 | 115 | 90 | 90 | 115 | 104 | 111 | 114 | 115 |
| | RzjisX/xa | | 9.0 | 2.8 | 1.2 | 0.18 | 0.18 | 1.2 | 1.0 | 1.1 | 1.1 | 1.2 |
| | surface free energy (mN/m) | total | 54.0 | 55.5 | 55.5 | 58.0 | 58.0 | 58.0 | 55.5 | 55.5 | 60.3 | 56.0 |
| | | variance component | 26 | 24 | 24 | 23 | 23 | 26.5 | 24 | 20.2 | 28.8 | 25.5 |
| | | polarity component $\gamma X_P$ | 22 | 24 | 24 | 27 | 27 | 24 | 24 | 31 | 24 | 25 |
| | | hydrogen bond component $\gamma X_H$ | 6.0 | 7.5 | 7.5 | 8.0 | 8.0 | 7.5 | 7.5 | 4.3 | 7.5 | 5.5 |
| | water contact angle HX(1) (°) | | 40 | 41 | 39 | 32 | 32 | 39 | 39 | 51 | 39 | 49 |
| | water contact angle HX(20) (°) | | 19 | 19 | 19 | 14 | 14 | 19 | 19 | 17 | 19 | 34 |
| | \|HX(1)-HX(20)\| | | 21 | 22 | 20 | 18 | 18 | 20 | 20 | 34 | 20 | 15 |
| | degree of crystallinity | | 34 | 34 | 34 | 34 | 34 | 34 | 34 | 3 | 34 | 35 |
| RzjisB/xa | | | 9.5 | 3.2 | 8.1 | 1.6 | 4.6 | 8.1 | 8.2 | 8.1 | 8.1 | 8.1 |

TABLE 9

| | | | Example 19 | Example 20 | Example 21 | Example 22 | Example 23 | Example 24 |
|---|---|---|---|---|---|---|---|---|
| layer Y | primary component | | addition reaction type silicone | addition reaction type silicone | addition reaction type silicone | addition reaction type silicone | addition reaction type silicone | addition reaction type silicone |
| | thickness (nm) | | 100 | 100 | 100 | 100 | 100 | 100 |
| | surface free | variance | 10 | 10 | 10 | 10 | 10 | 10 |

TABLE 9-continued

| | | | | | | | | |
|---|---|---|---|---|---|---|---|---|
| | energy (mN/m) | component | | | | | | |
| | | polarity component $\gamma Y_P$ | 0.3 | 0.4 | 0.4 | 0.5 | 0.4 | 0.4 |
| | | hydrogen bond component $\gamma Y_H$ | 1.7 | 1.8 | 1.8 | 1.8 | 1.8 | 1.8 |
| | water contact angle HY(1) (°) | | 110 | 110 | 110 | 110 | 110 | 110 |
| | water contact angle HY(20) (°) | | 107 | 95 | 91 | 85 | 85 | 91 |
| | $\lvert HY(1)-HY(20) \rvert$ (°) | | 3 | 15 | 19 | 45 | 45 | 19 |
| | F(A) (mN/50 mm) | | 90 | 90 | 90 | 90 | 90 | 90 |
| | F(B) (mN/50 mm) | | 560 | 560 | 560 | 560 | 560 | 560 |
| | solvent durability ratio (%) | | 16 | 16 | 16 | 16 | 16 | 16 |
| release film | object to be released | | barium titanate | barium titanate | barium titanate | barium titanate | acrylate | acrylate |
| | peelability of object to be released | peeling force (mN/50 mm) | 30 | 32 | 30 | 31 | 32 | 30 |
| | solvent resistance in terms of haze change | Hz (A) (%) | 20 | 20 | 10 | 10 | 15 | 10 |
| | | Hz (B) (%) | 20 | 20 | 10 | 10 | 15 | 10 |
| | | ΔHz (%) | 0 | 0 | 0 | 0 | 0 | 0 |
| | solvent resistance in terms of surface roughness | surface roughness Sa (A) (nm) | 21 | 19 | 6 | 5 | 5 | 6 |
| | | surface roughness Sa (B) (nm) | 21 | 19 | 6 | 5 | 5 | 6 |
| | | ΔSa (nm) | 0 | 0 | 0 | 0 | 0 | 0 |
| | removal of layers X and Y | method for removal | rinsing | rinsing | rinsing | rinsing | rinsing | rinsing |
| | | water contact angle after removal (°) | 90 | 79 | 71 | 71 | 73 | 70 |
| | recycling | method for recycling | melt-extrusion | melt-extrusion | melt-extrusion | melt-extrusion | melt-extrusion | melt-extrusion |
| | | IV(R) | 0.51 | 0.59 | 0.59 | 0.59 | 0.58 | 0.59 |
| | removability of layers X and Y after moist heat treatment | method for removal | rinsing | rinsing | rinsing | rinsing | rinsing | rinsing |
| | | water contact angle after removal (°) | 94 | 81 | 71 | 86 | 73 | 70 |

| | | | | Example 25 | Example 26 | Example 27 | Example 28 |
|---|---|---|---|---|---|---|---|
| | layer Y | primary component | | addition reaction type silicone | addition reaction type silicone | addition reaction type silicone | addition reaction type silicone |
| | | thickness (nm) | | 100 | 100 | 100 | 100 |
| | | surface free energy (mN/m) | variance component | 10 | 11 | 10 | 10 |
| | | | polarity component $\gamma Y_P$ | 0.4 | 0.6 | 0.4 | 0.4 |
| | | | hydrogen bond component $\gamma Y_H$ | 1.8 | 1.0 | 1.8 | 1.7 |
| | | water contact angle HY(1) (°) | | 110 | 110 | 110 | 110 |
| | | water contact angle HY(20) (°) | | 89 | 78 | 90 | 107 |
| | | $\lvert HY(1)-HY(20) \rvert$ (°) | | 21 | 32 | 20 | 3 |
| | | F(A) (mN/50 mm) | | 90 | 90 | 90 | 90 |
| | | F(B) (mN/50 mm) | | 560 | 13000 | 560 | 1100 |
| | | solvent durability ratio (%) | | 16 | 0.7 | 16 | 9 |
| | release film | object to be released | | barium titanate | barium titanate | barium titanate | barium titanate |
| | | peelability | peeling | 30 | 45 | 30 | 41 |

TABLE 9-continued

| | | | | | |
|---|---|---|---|---|---|
| of object to be released | force (mN/50 mm) | | | | |
| solvent resistance in terms of haze change | Hz (A) (%) | 10 | 10 | 10 | 10 |
| | Hz (B) (%) | 10 | 24 | 10 | 22 |
| | ΔHz (%) | 0 | 14 | 0 | 12 |
| solvent resistance in terms of surface roughness | surface roughness Sa (A) (nm) | 6 | 6 | 6 | 6 |
| | surface roughness Sa (B) (nm) | 6 | 16 | 6 | 14 |
| | ΔSa (nm) | 0 | 10 | 0 | 8 |
| removal of layers X and Y | method for removal | rinsing | rinsing | rinsing | rinsing |
| | water contact angle after removal (°) | 70 | 70 | 70 | 94 |
| recycling | method for recycling | melt-extrusion | melt-extrusion | melt-extrusion | melt-extrusion |
| | IV(R) | 0.59 | 0.59 | 0.59 | 0.50 |
| removability of layers X and Y after moist heat treatment | method for removal | rinsing | rinsing | rinsing | rinsing |
| | water contact angle after removal (°) | 70 | 70 | 70 | 94 |

TABLE 10

| | | | | Example 29 | Example 30 | Example 31 | Example 32 | Example 33 | Example 34 | Example 35 | Example 36 | Example 37 |
|---|---|---|---|---|---|---|---|---|---|---|---|---|
| polyester film | layer A | component material | | PET-1 MB-D | PET-1 MB-D | PET-1 MB-D recycled material 1 | PET-1 MB-D recycled material 1 | PET-1 MB-D recycled material 1 | PET-1 MB-D recycled material 2 | PET-1 MB-D | PET-1 MB-C | PET-1 MB-B |
| | layer B | component material | | PET-1 MB-B | PET-1 MB-B | PET-1 MB-B | PET-1 MB-B recycled material 1 | PET-1 MB-B recycled material 1 | PET-1 MB-B | PET-1 MB-D | PET-1 MB-C | PET-1 MB-D |
| | | RzjisB (nm) | | 813 | 813 | 813 | 890 | 890 | 813 | 118 | 1100 | 121 |
| | IV | | | 0.63 | 0.63 | 0.63 | 0.62 | 0.61 | 0.63 | 0.65 | 0.62 | 0.65 |
| | production conditions | ratio in MD | temperature (° C.) | 90 | 90 | 90 | 90 | 90 | 90 | 90 | 90 | 90 |
| | | | ratio | 3.8 | 3.8 | 3.8 | 3.8 | 3.8 | 3.8 | 3.8 | 3.8 | 3.8 |
| | | ratio in TD | temperature (° C.) | 100 | 100 | 100 | 100 | 100 | 100 | 100 | 100 | 100 |
| | | | ratio | 4.3 | 4.3 | 4.3 | 4.3 | 4.3 | 4.3 | 4.3 | 4.3 | 4.3 |
| | | heat treatment temperature (° C.) | | 235 | 235 | 235 | 235 | 235 | 235 | 235 | 235 | 235 |
| | thickness (nm) | | | 30 | 30 | 30 | 30 | 30 | 30 | 30 | 30 | 30 |

TABLE 11

| | | Example 29 | Example 30 | Example 31 | Example 32 | Example 33 | Example 34 | Example 35 | Example 36 | Example 37 |
|---|---|---|---|---|---|---|---|---|---|---|
| layer X | existence of PVA skeleton | ○ | ○ | ○ | ○ | ○ | ○ | ○ | ○ | ○ |
| | existence of sulfonate modified PVA skeleton | ○ | x | ○ | ○ | ○ | ○ | ○ | ○ | ○ |
| | modification group | sodium sulfonate | carboxylic acid sodium | sodium sulfonate | sodium sulfonate | sodium sulfonate | sodium sulfonate | sodium sulfonate | sodium sulfonate | sodium sulfonate |
| | degree of copolymerization (mol %) | 3 | 1 | 1 | 1 | 1 | 1 | 1 | 1 | 1 |
| | degree of saponification | 88 | 88 | 88 | 88 | 88 | 88 | 88 | 88 | 88 |
| | average degree of polymerization | 400 | 1000 | 500 | 500 | 500 | 500 | 500 | 500 | 500 |
| | thickness (xa) (nm) | 100 | 100 | 100 | 100 | 100 | 100 | 100 | 100 | 100 |

TABLE 11-continued

| | | Example 29 | Example 30 | Example 31 | Example 32 | Example 33 | Example 34 | Example 35 | Example 36 | Example 37 |
|---|---|---|---|---|---|---|---|---|---|---|
| RzjisX (nm) | | 115 | 115 | 311 | 311 | 311 | 280 | 110 | 1124 | 841 |
| RzjisX/xa | | 1.2 | 1.2 | 3.1 | 3.1 | 3.1 | 2.8 | 1.1 | 11.1 | 8.4 |
| surface free energy (mN/m) | total | 58.8 | 58.8 | 55.0 | 55.0 | 55.0 | 55.5 | 55.5 | 55.5 | 55.5 |
| | variance component | 23 | 23 | 25.5 | 25.5 | 25.5 | 24 | 24 | 24 | 24 |
| | polarity component $\gamma X_P$ | 28 | 32 | 23 | 23 | 23 | 24 | 24 | 24 | 24 |
| | hydrogen bond component $\gamma X_H$ | 7.8 | 3.8 | 6.5 | 6.5 | 6.5 | 7.5 | 7.5 | 7.5 | 7.5 |
| water contact angle HX(1) (°) | | 30 | 40 | 40 | 40 | 40 | 39 | 39 | 42 | 41 |
| water contact angle HX(20) (°) | | 14 | 14 | 19 | 19 | 19 | 19 | 19 | 22 | 19 |
| \|HX(1)-HX(20)\| | | 16 | 26 | 21 | 21 | 21 | 20 | 20 | 20 | 22 |
| degree of crystallinity | | 21 | 38 | 34 | 34 | 34 | 34 | 34 | 34 | 34 |
| RzjisB/xa | | 8.1 | 8.1 | 8.1 | 8.9 | 8.9 | 8.1 | 1.2 | 11.0 | 1.2 |

TABLE 12

| | | | Example 29 | Example 30 | Example 31 | Example 32 | Example 33 | Example 34 | Example 35 | Example 36 | Example 37 |
|---|---|---|---|---|---|---|---|---|---|---|---|
| layer Y | primary component | | addition reaction type silicone | addition reaction type silicone | addition reaction type silicone | addition reaction type silicone | addition reaction type silicone | addition reaction type silicone | addition reaction type silicone | addition reaction type silicone | addition reaction type silicone |
| | thickness (nm) | | 100 | 100 | 100 | 100 | 100 | 100 | 100 | 100 | 100 |
| | surface free energy (mN/m) | variance component | 10 | 11 | 10 | 10 | 10 | 10 | 10 | 10 | 10 |
| | | polarity component $\gamma Y_P$ | 0.4 | 0.6 | 0.4 | 0.4 | 0.4 | 0.4 | 0.4 | 0.4 | 0.4 |
| | | hydrogen bond component $\gamma Y_H$ | 1.8 | 0.9 | 1.8 | 1.8 | 1.8 | 1.8 | 1.8 | 1.8 | 1.8 |
| | water contact angle HY(1) (°) | | 110 | 110 | 110 | 110 | 110 | 110 | 110 | 110 | 110 |
| | water contact angle HY(20) (°) | | 76 | 100 | 107 | 107 | 107 | 98 | 91 | 109 | 107 |
| | \|HY(1)-HY(20)\| (°) | | 24 | 10 | 3 | 3 | 3 | 12 | 19 | 1 | 3 |
| | F(A) (mN/50 mm) | | 90 | 90 | 90 | 90 | 90 | 90 | 90 | 90 | 90 |
| | F(B) (mN/50 mm) | | 1000 | 11000 | 560 | 560 | 560 | 560 | 560 | 560 | 560 |
| | solvent durability ratio (%) | | 9 | 0.8 | 16 | 16 | 16 | 16 | 16 | 16 | 16 |
| release film | object to be released | | barium titanate | barium titanate | barium titanate | barium titanate | barium titanate | barium titanate | barium titanate | barium titanate | barium titanate |
| | peelability of object to be released | peeling force (mN/50 mm) | 32 | 43 | 30 | 30 | 30 | 30 | 30 | 34 | 32 |
| | solvent resistance in terms of haze change | Hz (A) (%) | 10 | 10 | 10 | 10 | 10 | 10 | 6 | 12 | 6 |
| | | Hz (B) (%) | 10 | 23 | 10 | 10 | 10 | 10 | 6 | 12 | 6 |
| | | ΔHz (%) | 0 | 13 | 0 | 0 | 0 | 0 | 0 | 0 | 0 |
| | solvent resistance in terms of surface roughness | surface roughness Sa (A) (nm) | 6 | 6 | 10 | 10 | 10 | 9 | 6 | 22 | 19 |
| | | surface roughness Sa (B) (nm) | 6 | 16 | 10 | 10 | 10 | 9 | 6 | 22 | 19 |
| | | ΔSa (nm) | 0 | 10 | 0 | 0 | 0 | 0 | 0 | 0 | 0 |
| | removal of layers X and Y | method for removal | rinsing | rinsing | rinsing | rinsing | rinsing | rinsing | rinsing | rinsing | rinsing |
| | | water contact angle after removal (°) | 70 | 94 | 90 | 90 | 87 | 83 | 71 | 92 | 91 |
| | recycling | method for recycling | melt-extrusion | melt-extrusion | melt-extrusion | melt-extrusion | melt-extrusion | melt-extrusion | melt-extrusion | melt-extrusion | melt-extrusion |
| | | IV(R) | 0.59 | 0.50 | 0.51 | 0.50 | 0.57 | 0.59 | 0.61 | 0.50 | 0.53 |
| | removability of layers X and Y after moist heat treatment | method for removal | rinsing | rinsing | rinsing | rinsing | rinsing | rinsing | rinsing | rinsing | rinsing |
| | | water contact angle after removal (°) | 70 | 94 | 90 | 90 | 90 | 83 | 97 | 97 | 97 |

TABLE 13

| | | | | Example 38 | Example 39 | Example 40 | Example 41 | Example 42 | Comparative example 3 |
|---|---|---|---|---|---|---|---|---|---|
| polyester film | layer A | component material | | — | PET-1 MB-D | PET-1 MB-A | PET-1 MB-D | PET-1 MB-D | PET-1 MB-D |
| | layer B | component material | | — | PET-1 MB-B | PET-1 MB-A | PET-1 MB-B | PET-1 MB-B | PET-1 MB-B |
| | | RzjisB (nm) | | 138 | 813 | 235 | 813 | 813 | 813 |
| | IV | | | — | 0.63 | 0.64 | 0.63 | 0.63 | 0.63 |
| | production conditions | ratio in MD | temperature (° C.) | 90 | 90 | 95 | 90 | 90 | 90 |
| | | | ratio | 3.8 | 3.8 | 3.5 | 3.8 | 3.8 | 3.8 |
| | | ratio in TD | temperature (° C.) | 100 | 100 | 95 | 130 | 100 | 100 |
| | | | ratio | 4.3 | 4.3 | 3.7 | 4.3 | 4.3 | 4.3 |
| | | heat treatment temperature (° C.) | | 235 | 235 | 220 | 235 | 235 | 235 |
| | thickness (nm) | | | 50 | 30 | 30 | 30 | 30 | 30 |

TABLE 14

| | | | Example 38 | Example 39 | Example 40 | Example 41 | Example 42 | Comparative example 3 |
|---|---|---|---|---|---|---|---|---|
| layer X | existence of PVA skeleton | | ○ | ○ | ○ | ○ | x | x |
| | existence of sulfonate modified PVA skeleton | | ○ | x | ○ | ○ | x | x |
| | modification group | | sodium sulfonate | 1,2-ethane diols | sodium sulfonate | sodium sulfonate | — | — |
| | degree of copolymerization (mol %) | | 1 | 10 | 3 | 1 | — | — |
| | degree of saponification | | 88 | 88 | 88 | 88 | — | — |
| | average degree of polymerization | | 500 | 300 | 200 | 500 | — | — |
| | thickness (xa) (nm) | | 100 | 100 | 100 | 100 | — | — |
| | RzjisX (nm) | | 131 | 111 | 94 | 311 | — | — |
| | RzjisX/xa | | 1.3 | 1.1 | 0.9 | 3.1 | — | — |
| | surface free energy (mN/m) | total | 55.5 | 61.0 | 60.5 | 55.0 | | |
| | | variance component | 24 | 17 | 23 | 25.5 | — | — |
| | | polarity component $\gamma X_P$ | 24 | 41 | 34 | 23 | — | — |
| | | hydrogen bond component $\gamma X_H$ | 7.5 | 3.0 | 3.5 | 6.5 | — | — |
| | water contact angle HX(1) (°) | | 39 | 51 | 30 | 40 | — | — |
| | water contact angle HX(20) (°) | | 19 | 17 | 5 | 19 | — | — |
| | \|HX(1)-HX(20)\| | | 20 | 34 | 25 | 21 | — | — |
| | degree of crystallinity | | 34 | 2 | 14 | 38 | — | — |
| RzjisB/xa | | | 1.4 | 8.1 | 2.4 | 8.1 | — | — |

TABLE 15

| | | | Example 38 | Example 39 | Example 40 | Example 41 | Example 42 | Comparative example 3 |
|---|---|---|---|---|---|---|---|---|
| layer Y | primary component | | addition reaction type silicone | addition reaction type silicone | addition reaction type silicone | addition reaction type silicone | ethylene-propylene/ethylene-hexene copolymer | addition reaction type silicone |
| | thickness (nm) | | 100 | 100 | 100 | 100 | 100 | 100 |
| | surface free energy (mN/m) | variance component | 10 | 11 | 10 | 10 | 28 | 11 |
| | | polarity component $\gamma Y_P$ | 0.4 | 0.9 | 0.3 | 0.4 | 0.8 | 0.2 |
| | | hydrogen bond component $\gamma X_H$ | 1.8 | 0.8 | 1.4 | 1.8 | 1.0 | 0.9 |
| | water contact angle HY(1) (°) | | 110 | 110 | 109 | 110 | 100 | 108 |
| | water contact angle HY(20) (°) | | 92 | 92 | 90 | 107 | 85 | 108 |
| | \|HY(1)-HY(20)\| (°) | | 18 | 18 | 19 | 3 | 15 | 0 |
| | F(A) (mN/50 mm) | | 90 | 90 | 90 | 90 | 200 | 90 |
| | F(B) (mN/50 mm) | | 560 | 560 | 1100 | 560 | 1000 | 5000 |
| | solvent durability ratio (%) | | 16 | 16 | 8 | 16 | 20 | 2 |
| release film | object to be released | | barium titanate | barium titanate | barium titanate | barium titanate | barium titanate | barium titanate |
| | peelability of object to be released | peeling force (mN/50 mm) | 30 | 30 | 50 | 30 | 60 | 35 |

TABLE 15-continued

| | | Example 38 | Example 39 | Example 40 | Example 41 | Example 42 | Comparative example 3 |
|---|---|---|---|---|---|---|---|
| solvent resistance in terms of haze change | Hz (A) (%) | 6 | 10 | 6 | 10 | 10 | 6 |
| | Hz (B) (%) | 6 | 26 | 10 | 10 | 12 | 6 |
| | ΔHz (%) | 0 | 16 | 4 | 0 | 2 | 0 |
| solvent resistance in terms of surface roughness | surface roughness Sa (A) (nm) | 70 | 9 | 5 | 10 | 6 | 5 |
| | surface roughness Sa (B) (nm) | 70 | 20 | 9 | 10 | 7 | 5 |
| | ΔSa (nm) | 0 | 11 | 4 | 0 | 1 | 0 |
| removal of layers X and Y | method for removal | rinsing | rinsing | rinsing | rinsing | rinsing | rinsing |
| | water contact angle after removal (°) | 70 | 70 | 94 | 75 | 72 | 98 |
| recycling | method for recycling | melt-extrusion | melt-extrusion | melt-extrusion | melt-extrusion | melt-extrusion | melt-extrusion |
| | IV(R) | — | 0.59 | 0.51 | 0.59 | 0.60 | — |
| removability of layers X and Y after moist heat treatment | method for removal | rinsing | rinsing | rinsing | rinsing | rinsing | rinsing |
| | water contact angle after removal (°) | 97 | 70 | 95 | 75 | 72 | 98 |

In Examples given above, if there are inconsistencies between explanations in Description and descriptions in Tables, priority should be given to the descriptions in Tables.

INDUSTRIAL APPLICABILITY

The laminated polyester film according to the present invention is high in solvent resistance in downstream processes and ensures high removability of the layers other than the polyester film. In addition, if a water repellent material is used to form the layer Y for the present invention, the film will serve suitably as a release film for a multilayer ceramic capacitor (MLCC) manufacturing process in which a dielectric paste is used to form the object to be released. Furthermore, the polyester film can be recovered easily from the release film used in the MLCC manufacturing process, and therefore, the polyester film can be recycled easily as material for a process for film production from melts.

The invention claimed is:

1. A laminated polyester film comprising a polyester film and a layer X satisfying the requirements given below:

requirement 1: $20 \leq \gamma X_P \leq 45$, and requirement 2: $3.0 \leq \gamma X_H \leq 10$, wherein $\gamma X_P$(mN/m) is the polar component of the surface free energy of the layer X, and $\gamma X_H$(mN/m) is the hydrogen bond component of the surface free energy of the layer X, and the laminated polyester film is designed to serve for release purposes, wherein a layer Y satisfying the requirements given below, a layer X, and a polyester film are stacked in this order, and a layer to be released is formed on the face of the layer Y opposite to the face in contact with the layer X so that the layer to be released can be peeled off from the layer Y:

requirement 9: $80 \leq HY(1) \leq 120$, and requirement 10: $1 \leq |HY(1)-HY(20)| \leq 90$ wherein HY(1)(°) is the contact angle measured 1 second after the contact of water with the layer Y, and wherein HY(20)(°) is the contact angle measured 20 seconds after the contact of water with the layer Y.

2. The laminated polyester film as set forth in claim 1, wherein the layer X contains a resin having a sulfonate modified polyvinyl alcohol skeleton.

3. The laminated polyester film as set forth in claim 1, wherein the thickness xa (nm) of the layer X and the surface roughness RzjisB (nm) of the face (face B) of the polyester film that is opposite to the face (face A) having the layer X satisfy the requirement given below:

requirement 3: $1.0 \leq RzjisB/xa \leq 20.0$ wherein xa (nm) is the thickness of the layer X.

4. The laminated polyester film as set forth in claim 1, wherein the thickness xa (nm) of the layer X and the surface roughness RzjisX (nm) of the layer X satisfy the requirement given below:

requirement 7: $0.01 \leq RzjisX/xa \leq 3.0$.

5. The laminated polyester film as set forth in claim 1, wherein the thickness xa (nm) of the layer X is 10 nm or more and 500 nm or less.

6. The laminated polyester film as set forth in claim 1, wherein the water contact angles HX(1)(°) and HX(20)(°) on the layer X satisfy the requirement given below:

requirement 8: $5 \leq |HX(1)-HX(20)| \leq 60$ wherein HX(1)(°) is the contact angle measured 1 second after the contact of water with the layer X, and HX(20)(°) is the contact angle measured 20 seconds after the contact of water with the layer X.

7. The laminated polyester film as set forth in claim 1, wherein the layer X has a degree of crystallinity of 14% or more and 40% or less.

8. The laminated polyester film as set forth in claim 1, wherein the layer X contains a resin having a degree of polymerization of more than 200.

9. The laminated polyester film as set forth in claim 1, wherein the surface of the layer Y has a solvent durability ratio of 5% or more and 100% or less as measured by the method described below:

[measuring method for solvent durability ratio]

testing machine: Gakushin type testing machine (Type II rubbing tester specified in JIS L 0849 (2013))

friction block: cotton cloth (#3 muslin) soaked with a toluene-ethanol mixed solvent (1:1 by mass)

load: 1 kg number of times of rubbing motion: 30 times of to-and-fro motion solvent durability ratio (%)=F(A)/F(B)×100

F(A): peel force for the surface of the layer Y, and

F(B): peel force for the surface of the layer Y after rubbing test with cloth soaked with solvent.

10. The laminated polyester film as set forth in claim 1, wherein the hydrogen bond component $\gamma Y_H$ of the surface free energy of the layer Y is 1.5 or more and 10 or less.

11. The laminated polyester film as set forth in claim 1, designed to be used for an application in which the layer X and the layer Y are removed after peeling off the layer to be released from the layer Y.

12. The laminated polyester film as set forth in claim 11, wherein the laminated polyester film is to be recycled after removing the layer X and the layer Y.

13. The laminated polyester film as set forth in claim 1, wherein the layer to be released is a ceramic green sheet containing barium titanate as primary component.

14. The laminated polyester film as set forth in claim 13, designed to be used at least as part of a release film for a manufacturing process for a multilayer ceramic capacitor (MLCC).

15. A production method for a polyester film using the laminated polyester film as set forth in claim 1, having at least the layer to be released, the layer Y, the layer X, and the polyester film containing a recycled polyester material, stacked in this order and including a step for peeling off the layer to be released from the layer Y, a step for removing the layer Y from the film deprived of the layer to be released, a step for producing a recycled material from the film deprived of the layer to be released and the layer Y, and a step for producing a film from the recycled material.

* * * * *